United States Patent
Kato et al.

(10) Patent No.: US 10,022,665 B2
(45) Date of Patent: Jul. 17, 2018

(54) ACIDIC GAS RECOVERY APPARATUS AND ACIDIC GAS RECOVERY METHOD

(71) Applicant: KABUSHIKI KAISHA TOSHIBA, Minato-ku (JP)

(72) Inventors: Yasuhiro Kato, Kawasaki (JP); Masatoshi Hodotsuka, Saitama (JP); Tetsuya Kaseda, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/685,425

(22) Filed: Aug. 24, 2017

(65) Prior Publication Data

US 2018/0056232 A1    Mar. 1, 2018

(30) Foreign Application Priority Data

Sep. 1, 2016 (JP) .................. 2016-170879

(51) Int. Cl.
| | | |
|---|---|---|
| *B01D 61/44* | (2006.01) | |
| *B01D 53/14* | (2006.01) | |
| *C01B 32/50* | (2017.01) | |

(52) U.S. Cl.
CPC ..... *B01D 53/1493* (2013.01); *B01D 53/1475* (2013.01); *B01D 2252/204* (2013.01); *B01D 2257/504* (2013.01); *C01B 32/50* (2017.08)

(58) Field of Classification Search
None
See application file for complete search history.

(56) References Cited

U.S. PATENT DOCUMENTS

| | | | |
|---|---|---|---|
| 2,779,758 A | 1/1957 | Neier et al. | |
| 3,974,258 A | 8/1976 | Poitevin et al. | |
| 6,517,700 B2 | 2/2003 | Byszewski | |
| 8,506,693 B2 | 8/2013 | Nagayasu et al. | |
| 2009/0035199 A1* | 2/2009 | Mortson | B01D 53/526 423/224 |
| 2015/0290576 A1 | 10/2015 | Kiguchi et al. | |

FOREIGN PATENT DOCUMENTS

| | | | |
|---|---|---|---|
| JP | | 3302126 B2 | 7/2002 |
| JP | | 3392646 B2 | 3/2003 |
| JP | | 5351728 B2 | 11/2013 |
| JP | | 5704438 B2 | 4/2015 |
| WO | WO 2010/061811 A1 | | 6/2010 |
| WO | WO 2014/077373 A1 | | 5/2014 |

* cited by examiner

*Primary Examiner* — Arun S Phasge
(74) *Attorney, Agent, or Firm* — Oblon, McClelland, Maier & Neustadt, L.L.P.

(57) ABSTRACT

The present embodiments provide an acidic gas recovery apparatus or method capable of efficiently reducing emission of amine to the environment. In the embodiment, an acidic gas recovery apparatus 10A comprises: an acidic gas-absorber 11a; a regeneration tower 12; a gas-cleaner 11b; a cleaning liquid drawing-out line L23; an absorbing liquid drawing-out line L21; and an acidic component-remover 13A. The cleaning water 27c from the cleaning liquid drawing-out line L23 and a purified lean solution 23C from the absorbing liquid drawing-out line L21 are supplied to the acidic component-remover 13A. The acidic component-remover 13A comprises a cathode 53, an anode 54, an absorbing liquid-purification compartment 57 for removing acidic components from the objective lean solution 23B, and cleaning liquid compartments 58-1 and 58-2. The cleaning water 27 is supplied to the cleaning liquid compartments.

10 Claims, 11 Drawing Sheets

ACIDIC GAS RECOVERY APPARATUS AND ACIDIC GAS RECOVERY METHOD

CROSS-REFERENCE TO RELATED APPLICATIONS

This application is based upon and claims the benefit of priority from the prior Japanese Patent Application No. 2016-170879, filed on Sep. 1, 2016, the entire contents of which are incorporated herein by reference.

FIELD

Embodiments of the present invention relate to an acidic gas recovery apparatus and an acidic gas recovery method.

BACKGROUND

Large fossil-fuel consumers, such as thermal power plants and ironworks, burn fossil fuels in boilers to generate combustion discharge gases. Those gases as well as natural gases and coal gasification gases (gasification gases) contain acidic gas components, such as, carbon dioxide ($CO_2$), $SO_x$, $NO_x$ and $H_2S$. In order not to emit those acidic gas components in the discharge gases into the atmosphere, methods for recovering the acidic gas components have been vigorously studied and developed. In those methods, discharge gases containing the acidic gas components are introduced into an absorption tower and brought into gas-liquid contact with an absorbing liquid containing an amino group-containing compound (amine-based compound) so that the absorbing liquid may absorb the acidic gas components to remove them from the treated gases.

For example, there is a known carbon dioxide recovery apparatus comprising: an absorption tower in which a discharge gas is brought into contact with an absorbing liquid containing an amino group-containing compound so that the absorbing liquid can absorb the acidic gas components such as carbon dioxide; and a regeneration tower in which the absorbing liquid loaded with the absorbed acidic gas components is heated to release the acidic gas components and thereby to be regenerated. The regenerated absorbing liquid is then supplied again to the absorption tower and reused there. In the apparatus, the absorbing liquid is thus circularly used in the system including the absorption and regeneration towers.

However, the above carbon dioxide recovery apparatus has a problem in that the discharge gas from which carbon dioxide is absorbed and removed by the amine-based absorbing liquid in the absorption tower, namely, the $CO_2$-removed discharge gas (decarbonated combustion discharge gas) is finally emitted together with the amine from the absorption tower into the atmosphere. Accordingly, since thermal power plants and the like exhaust a large amount of decarbonated combustion discharge gas, they may also release a large amount of amine at the same time. It is hence necessary to effectively reduce the amine emitted together with the decarbonated discharge gas into the atmosphere. In view of that, there is, for example, a known cleaning apparatus in which the decarbonated discharge gas is brought into contact with a cleaning liquid so as to recover the amine accompanying the discharge gas.

Further, when carbon dioxide in the discharge gas is absorbed in the recovery apparatus, not only $SO_x$ and $NO_x$ but also other inorganic acids, such as, carbonyl sulfide, hydrogen cyanate, thiocyanic acid and thiosulfuric acid, may react with the amino group-containing compound contained in the absorbing liquid to form degradation products referred to as "heat stable amine salts: HSAS". Further, when the absorbing liquid is heated to be regenerated, the amino group-containing compound may be decomposed thermally or by reaction with oxygen in the discharge gas and, as a result of that, heat stable amine salts are also formed.

The heat stable amine salts are not thermally decomposed in the heating procedure for regenerating the absorbing liquid in the regeneration tower, and hence are not removed from but accumulated in the absorbing liquid. The heat stable amine salts thus accumulated not only impair the absorbing liquid to lower the efficiency of acidic gas absorption but also cause corrosion of the apparatus. It is hence desired to remove the heat stable amine salts from the absorbing liquid.

As a method for removing the heat stable amine salts from the absorbing liquid, it is known to adopt an electrodialyser of three-compartment structure, for example. The electrodialyser comprises a bipolar membrane in combination with plural ion-exchange membranes, and has three compartments, namely, an amine-purification compartment, an amine-recovery compartment and an acid-recovery compartment. Those compartments are provided between the electrodes facing each other, and aligned in the above order from the cathode side to the anode side. In the electrodialyser, the absorbing liquid undergoes electrodialysis so that the heat stable amine salts migrate from the absorbing liquid to a concentrate to be removed.

DETAILED DESCRIPTION

The acidic gas recovery apparatus according the embodiment comprises:

an acidic gas-absorber configured to absorb at least a part of acidic gases contained in an objective gas into an absorbing liquid and to discharge said objective gas as an acid gas-removed gas;

a regenerator configured to be provided with said absorbing liquid from said acidic gas-absorber and to release said acidic gases absorbed in said absorbing liquid;

a gas-cleaner configured to clean said acid gas-removed gas discharged from said acidic gas-absorber with a cleaning liquid;

a cleaning liquid drawing-out line configured to draw out said cleaning liquid;

an absorbing liquid drawing-out line configured to draw a part of the absorbing liquid supplied to said acidic gas-absorber; and an acidic component-remover configure to be supplied with said cleaning liquid and said absorbing liquid via said cleaning liquid drawing-out line and said absorbing liquid drawing-out line, respectively; wherein said acidic component-remover comprises a cathode, an anode, an absorbing liquid-purification compartment configured to remove acidic components of said absorbing liquid, and a cleaning liquid compartment configured to be supplied with said cleaning liquid.

Further, the acidic gas recovery method according to the embodiment comprises:

an absorption step absorbing at least a part of acidic gases contained in an objective gas into an absorbing liquid and discharging said objective gas as an acid gas-removed gas;

a gas-cleaning step cleaning said acid gas-removed gas with a cleaning liquid; and an acidic component-removal step removing acidic components from said absorbing liquid in an acidic component-remover, the acidic component-remover comprising an anode, a cathode, an absorbing liquid-purification compartment provided between said anode and said cathode and a cleaning liquid compartment provided between said anode and said cathode, wherein said absorbing liquid-purification compartment and said cleaning liquid compartment are separated with at least one membrane, wherein the acidic component-removal step comprises:

supplying at least a part of said absorbing liquid to be used in said absorption step to said absorbing liquid-purification compartment in said acidic component-remover;

supplying at least a part of said cleaning liquid to said cleaning liquid compartment in said acidic component-remover; and applying voltage between said anode and said cathode.

Embodiments will now be explained with reference to the accompanying drawings. In the following description, the present embodiments will be explained provided that the acidic gas is carbon dioxide ($CO_2$).

First Embodiment

Figure 1:
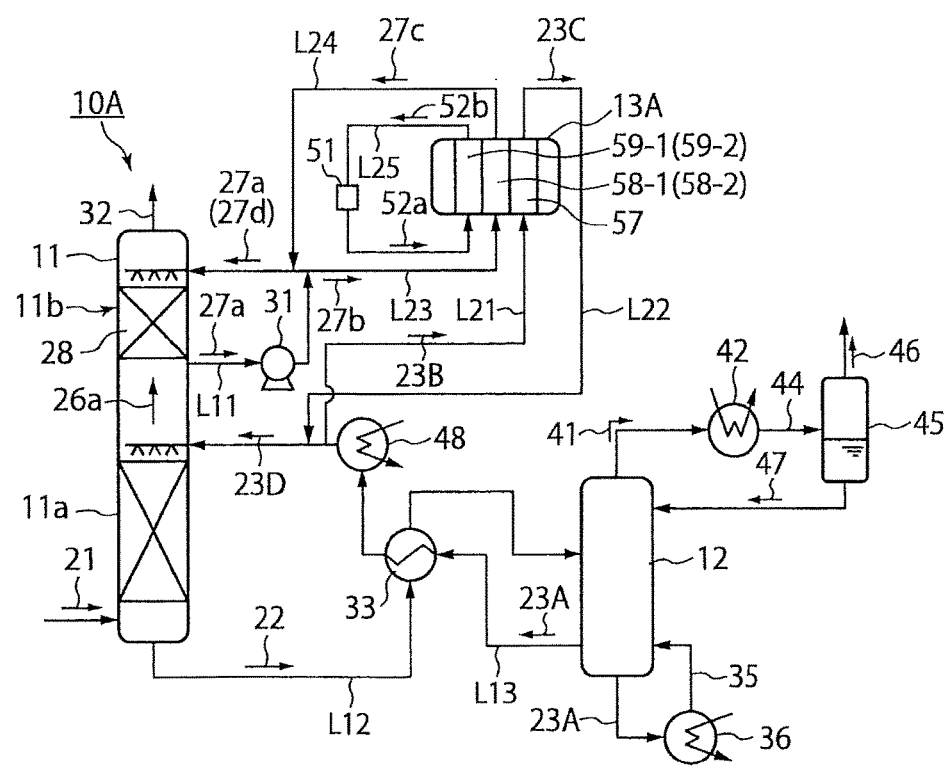
FIG. 1 schematically shows a structure of the acidic gas recovery apparatus according a first embodiment.

FIG. 1 schematically shows a structure of the acidic gas recovery apparatus according a first embodiment. As shown in FIG. 1, the acidic gas recovery apparatus 10A comprises an absorption tower 11, a regeneration tower (regenerator) 12, and an acidic component-remover 13A. In the acidic gas recovery apparatus 10A, an absorbing liquid for absorbing $CO_2$ in a $CO_2$-containing discharge gas (objective gas) 21 is circulated between the absorption tower 11 and the regeneration tower 12 (hereinafter, this circulation area is often referred to as "inner system"). The absorbing liquid loaded with the $CO_2$ absorbed from the discharge gas 21 (hereinafter, this absorbing liquid is often referred to as "rich solution 22") is supplied from the absorption tower 11 to the regeneration tower 12. In the regeneration tower 12, the $CO_2$ is partly or almost completely removed from the rich solution 22 to regenerate the absorbing liquid (hereinafter, this regenerated absorbing liquid is often referred to as "lean solution 23A"). The lean solution 23A is then supplied to the absorption tower 11 from the regeneration tower 12.

The absorbing liquid is an aqueous amine-based solution containing water and an amine-based compound (amino group-containing compound). Examples of the amine-based compound include: primary amines, such as, monoethanolamine and 2-amino-2-methyl-1-propanol; secondary amines, such as, diethanolamine and 2-methylaminoethanol; tertiary amines, such as. triethanolamine and N-methyldiethanolamine; polyethylene-polyamines, such as, ethylenediamine, triethylenediamine and diethylenetriamine; cyclic amines, such as, piperazines, piperidines and pyrrolidines; polyamines, such as, xylylenediamine; and amino acids, such as, methylaminocarboxylic acid. Those may be adopted singly or in combination of two or more. The absorbing liquid normally contains the amine-based compound normally in an amount of 10 to 70 wt %, and may further contain other compounds, such as, a reaction accelerator, a nitrogen-containing compound for improving absorption of acidic gases such as $CO_2$, an anticorrosive agent for preventing corrosion of the plant facilities, an antifoaming agent for preventing foaming, an oxidation inhibitor for preventing deterioration of the absorbing liquid, and a pH adjuster. Those compounds may be added in such amounts that they do not impair the function of the absorbing liquid.

As described later in detail, the lean solution 23A in the present embodiment is an absorbing liquid regenerated by removing $CO_2$ partly or almost completely in the regeneration tower 12. On the way to the absorption tower 11, the lean solution 23A is partly drawn out to be an objective lean solution 23B. The objective lean solution 23B is then fed to the acidic component-remover 13A from the inner system. In the acidic component-remover 13A, acidic components of heat stable amine salts are removed from the objective lean solution 23B to produce a purified lean solution 23C. The purified lean solution 23C is returned to the inner system, and mixed with the lean solution 23A to be a mixed lean solution 23D, which is then supplied to the absorption tower 11. In the present specification, the "absorbing liquid" inclusively means the lean solution 23A, the objective lean solution 23B, the purified lean solution 23C and the mixed lean solution 23D.

The discharge gas 21 is a $CO_2$-containing exhaust gas, such as, a combustion discharge gas exhausted from boilers, gas turbines and the like in thermal power plants or the like, or a process discharge gas generated from ironworks. The discharge gas 21 is pressurized with a ventilator or the like, cooled in a cooling tower, and then supplied through a flue to the absorption tower 11 from an intake provided on the side wall near the tower bottom (foot of the tower).

The absorption tower 11 comprises a $CO_2$-absorption unit (acidic gas-absorber) 11a and a gas-cleaner 11b. In the $CO_2$-absorption unit, the mixed lean solution 23D absorbs $CO_2$ in the discharge gas 21 to produce an acid gas-removed gas ($CO_2$-removed discharge gas) 26. In the gas-cleaner 11b, the acid gas-removed gas 26 produced in the $CO_2$-absorption unit 11a is then washed with a cleaning water 27a serving as the cleaning liquid to recover amine accompanying the $CO_2$-removed discharge gas 26a.

The $CO_2$-absorption unit 11a is filled with a packing for enhancing the efficiency of gas-liquid contact, and is equipped with a spray nozzle on the top. From the spray nozzle, the mixed lean solution 23D supplied to the absorption tower 11 is scatteringly showered down to the $CO_2$-absorption unit 11a. On the other hand, the discharge gas 21 fed into the tower flows from the bottom area to the tower top (upper area). In the $CO_2$-absorption unit 11a, the discharge gas 21 moving upward in the tower is thus brought into counterflow contact with the mixed lean solution 23D.

As a result, the following reactions (1) and (2) proceed to form a heat-decomposable salt ($RNH_2CO_3$) and a heat stable amine salt (RNHX) if the absorbing liquid contains a tertiary amine, so that $CO_2$ in the discharge gas 21 is absorbed in the mixed lean solution 23D and thereby removed from the discharge gas 21. Meanwhile, the mixed lean solution 23D thus absorbs $CO_2$ in the discharge gas 21 and converts to the rich solution 22, which is stored in the bottom area. The rich solution 22 contains the heat-decomposable salt and the heat stable amine salt. Heat stable amine salts are also formed from other acidic substances absorbed in the solution. Examples of those acidic substances include: organic acids formed by reactions with oxygen contained in the discharge gas 21, and inorganic acids contained in the discharge gas 21, such as, $SO_x$, $NO_x$, carbonyl sulfide, hydrogen cyanate, thiocyanate and thiosulfate. The heat stable amine salts are accumulated in the rich solution 22.

 (1)

 (2)

The $CO_2$-removed discharge gas 26a discharged from the $CO_2$-absorption unit 11a moves upward in the absorption tower 11 and comes into the gas-cleaner 11b.

In the gas-cleaner 11b, the $CO_2$-removed discharge gas 26a is washed with the cleaning water 27a to recover amine accompanying the $CO_2$-removed discharge gas 26a. In the present embodiment, the gas-cleaner 11b comprises a water-cleaner 28 where the $CO_2$-removed discharge gas 26a is washed with the cleaning water 27a. The water-cleaner 28 is installed in the absorption tower 11, and is provided on the downstream side of the $CO_2$-absorption unit 11a along the flow of the $CO_2$-removed discharge gas 26a. Accordingly, the water-cleaner 28 is positioned above the $CO_2$-absorption unit 11a. The water-cleaner 28 is equipped with a spray nozzle on the top. From the spray nozzle, the cleaning water 27a supplied to the absorption tower 11 is scatteringly showered down to the water-cleaner 28. In the water-cleaner 28, the $CO_2$-removed discharge gas 26a is washed with the cleaning water 27a to remove amine accompanying the $CO_2$-removed discharge gas 26a. Although included in the absorption tower 11 in FIG. 1, the water-cleaner 28 may be installed outside of the absorption tower 11 to be a gas-cleaning tower independent from the absorption tower 11.

The cleaning water 27a is, for example, stored in a cleaning water-tank (not shown) installed in the lower area of the water-cleaner 28. The cleaning water-tank is connected to a cleaning water-circulation line L11 equipped with a circulation pump 31. The cleaning water 27a is pressurized by the circulation pump 31 and returned to the tower from the upper area of the water-cleaner 28.

The more acidic the cleaning water 27a is, the higher cleaning efficiency it has. Accordingly, for example, at the time of starting operation of the acidic gas recovery apparatus, pure water, aqueous sulfuric acid or the like are preferably adopted. However, according as the apparatus is kept operated, the amine-based solution used as the absorbing liquid is accumulated in the cleaning water 27a and hence the cleaning water 27a tends to become alkaline.

The cleaning water 27a contains amine absorbed from the $CO_2$-removed discharge gas 26a, and the amine concentration therein continues to increase while the cleaning water 27a keeps circulating through between the water-cleaner 28 and the cleaning water-circulation line L11. Accordingly, the cleaning water 27a becomes impaired in the performance of recovering amine. In the present embodiment, the cleaning water 27a is partly drawn out and amine contained therein is removed in the acidic component-remover 13A. For compensating the drawn-out cleaning water 27a, a fresh cleaning water 27e in the same amount as the drawn-out cleaning water may be supplied to the cleaning water-circulation line L11. It is also possible to partly drain out the cleaning water 27a circulating through between the water-cleaner 28 and the cleaning water-circulation line L11.

After purified in the gas-cleaner 11b, the $CO_2$-removed discharge gas 26a is discharged to the outside as a purified gas 32 from the top of the absorption tower 11.

Meanwhile, the rich solution 22 stored in the bottom area of the absorption tower 11 is discharged from the bottom, and led to a rich solution-supply line L12 equipped with a pump (not shown). The rich solution 22 pressurized by the pump is sent to a heat exchanger 33, then undergoes heat exchange with the lean solution 23A regenerated in the regeneration tower 12, and subsequently is fed to the regeneration tower 12. In course of the heat exchange between the rich solution 22 and the lean solution 23A in the heat exchanger 33, the lean solution 23A serves as a heat source to heat the rich solution 22 and, in contrast, the rich solution 22 serves as a cooling source to cool the lean solution 23A. The heat exchanger may be a known one, such as, a plate heat exchanger or a shell and tube heat exchanger.

In the regeneration tower 12, $CO_2$ is released and separated from the rich solution 22 so that the rich solution 22 may be regenerated as the lean solution 23A. The rich solution 22 is supplied to the regeneration tower 12, and then heated with the lean solution 23A and steam 35 supplied to the regeneration tower 12. The lean solution 23A and the steam 35 are generated by heat exchange between the lean solution 23A and saturated steam in a reboiler 36. From the rich solution 22 thus heated with the steam, $CO_2$ contained therein is eliminated. In this way, $CO_2$ in the rich solution 22 is partly or almost completely removed and thereby the rich solution 22 is converted into the lean solution 23A.

The lean solution 23A stored in the regeneration tower 12 is partly discharged therefrom and heated in the reboiler 36, and thereafter returned to the regeneration tower 12. When heated in the reboiler 36, the lean solution 23A generates steam and releases $CO_2$ residually remaining therein. The generated steam and $CO_2$ gas are returned to the regeneration tower 12 to heat the rich solution 22 supplied to the regeneration tower 12. The $CO_2$ gas is then exhausted out of the regeneration tower 12. The lean solution 23A discharged from the regeneration tower 12 is pressurized by a lean solution-pump (not shown) and fed to the absorption tower 11 via the heat exchanger 33.

From the upper area of the regeneration tower 12, the $CO_2$ gas is exhausted together with the steam simultaneously generated from the lean solution 23A. The mixed gas 41 comprising the $CO_2$ gas and the steam is cooled with cooling water in a cooler 42, and the steam condenses to water. The mixed fluid 44 containing the condensed water and the $CO_2$ gas is supplied to a gas-liquid separator 45, where the $CO_2$ gas 46 and water 47 are separated. While the $CO_2$ gas 46 is exhausted, the water 47 is drained out from the bottom area of the separator 45 and sent to the upper area of the regeneration tower 12.

The lean solution 23A stored in the regeneration tower 12 is drained out from the bottom area of the regeneration tower 12 into a lean solution-evacuation line L13, and then led to the heat exchanger 33. In the heat exchanger 33, the lean solution 23A is cooled by heat exchange with the rich solution 22. Subsequently, the lean solution 23A is pressurized by a pump (not shown), cooled with cooling water in a cooler 48, and then supplied to the absorption tower 11.

The lean solution-evacuation line L13 diverges into an absorbing liquid drawing-out line L21 connecting to the acidic component-remover 13A. Through the absorbing liquid drawing-out line L21, the lean solution 23A sent to the absorption tower 11 is partly drawn out and supplied to the acidic component-remover 13A as the objective lean solution 23B. The acidic component-remover 13A and the lean solution-evacuation line L13 are connected by a purified absorption liquid-supply line L22, through which the purified lean solution 23C discharged from the acidic component-remover 13A is transferred to the lean solution-evacuation line L13. The lean solution-evacuation line L13 diverges into the absorbing liquid drawing-out line L21 at a position between the cooler 48 and the absorption tower 11, but the diverging point may be provided on the upstream side of the cooler 48 along the flow of the absorption liquid.

The cleaning water-circulation line L11 diverges into a cleaning liquid drawing-out line L23 connecting to the acidic component-remover 13A. Through the cleaning liquid drawing-out line L23, the cleaning water 27a sent to the absorption tower 11 is partly drawn out and supplied to the acidic component-remover 13A as the cleaning water 27b. The cleaning water-circulation line L11 and the evacuation side of the acidic component-remover 13A are connected by a cleaning liquid-evacuation line L24, through which the cleaning water 27c discharged from the acidic component-remover 13A is transferred to the cleaning water-circulation line L11. The cleaning waters 27a and 27c are mixed and supplied to the water-cleaner 28 as the cleaning water 27d.

The acidic component-remover 13A is connected to a concentrate tank 51 via a concentrate-circulation line L25, through which a concentrate 52a is supplied from the concentrate tank 51 to the acidic component-remover 13A and also through which a concentrate 52b is discharged from the acidic component-remover 13A and transferred to the concentrate tank 51.

Figure 2:
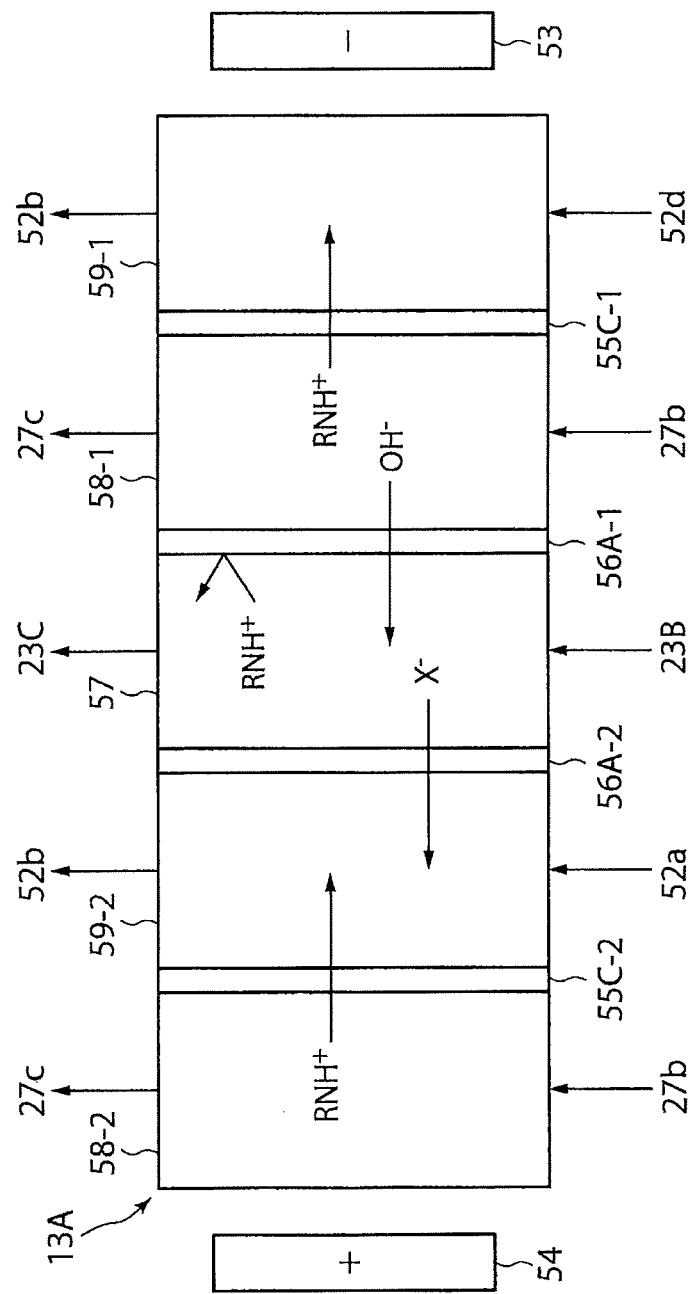
FIG. 2 schematically shows a structure of the acidic component-remover.

In the acidic component-remover 13A, the cleaning water 27b introduced from the cleaning liquid drawing-out line L23 is treated to remove amine therefrom and also the objective lean solution 23B introduced from the absorbing liquid drawing-out line L21 is treated to remove acidic components of heat stable amine salts accumulated therein. FIG. 2 shows a structure of the acidic component-remover 13A. As shown in FIG. 2, the acidic component-remover 13A comprises a cathode 53, an anode 54, cation-exchange membranes 55C-1 and 55C-2, and anion-exchange membranes 56A-1 and 56A-12. The acidic component-remover 13A is divided in such three areas as are an absorbing liquid-purification compartment 57, cleaning liquid compartments 58-1 and 58-2, and concentrate compartments 59-1 and 59-2. Those compartments are separated with the cation-exchange membranes 55C-1 and 55C-2 and the anion-exchange membranes 56A-1 and 56A-2. In the acidic component-remover 13A, the membranes are provided between the cathode 53 and the anode 54, and are aligned in the order of the cation-exchange membrane 55C-1, the anion-exchange membranes 56A-1 and 56A-2, and the cation-exchange membrane 55C-2 from the cathode 53 side to the anode 54 side. Accordingly, in the present embodiment, the acidic component-remover 13A comprises five compartments separated with the ion-exchange membranes, and the compartments are aligned in the order of the concentrate compartment 59-1, the cleaning liquid compartment 58-1, the absorbing liquid-purification compartment 57, the concentrate compartment 59-2 and the cleaning liquid compartment 58-2 from the cathode 53 side to the anode 54 side. Specifically, the five compartments, namely, the concentrate compartment 59-1, the cleaning liquid compartment 58-1, the absorbing liquid-purification compartment 57, the concentrate compartment 59-2 and the cleaning liquid compartment 58-2 are provided between the cathode 53 and the anode 54, and are separated with the cation-exchange membranes 55C-1 and 55C-2 and the anion-exchange membranes 56A-1 and 56A-2. Accordingly, the insides of the compartments can be individually impressed with voltage via the cation-exchange membranes 55C-1 and 55C-2 and the anion-exchange membranes 56A-1 and 56A-12.

The cation-exchange membranes 55C-1 and 55C-2 are cation exchange group-containing polymer films through which cations can permeate but anions cannot. For example, polymer films having one or more of sulfonic acid groups, carboxylic acid groups, phosphonic acid groups, sulfate groups and phosphate groups are usable as the cation-exchange membranes 55C-1 and 55C-2. Examples of the usable films include known cation-exchange membranes, such as, NEOSEPTA CMX, NEOSEPTA CMB ([trademark], manufactured by ASTOM Corporation), SELEMION CMV, SELEMION CMD, SELEMION CSO, and SELEMION CMF ([trademark], manufactured by ASAHI GLASS CO., LTD.).

The anion-exchange membranes 56A-1 and 56A-2 are anion exchange group-containing polymer films through which anions can permeate but cations cannot. For example, polymer films having strongly basic quaternary ammonium groups and weakly basic functional groups such as primary, secondary and tertiary amino groups are usable as the anion-exchange membranes 56A-1 and 56A-2. Examples of the usable films include known anion-exchange membranes, such as, NEOSEPTA AMX, NEOSEPTA AHA ([trademark], manufactured by ASTOM Corporation), SELEMION AMV, SELEMION AMT, SELEMION DSV, SELEMION ASV and SELEMION AHO ([trademark], manufactured by ASAHI GLASS CO., LTD.).

The absorbing liquid-purification compartment 57 is provided between the anion-exchange membranes 56A-1 and 56A-2, is supplied with the objective lean solution 23B, and is positioned on the anode 54 side of the cleaning liquid compartment 58-1 via the anion-exchange membrane 56A-1 and on the cathode 53 side of the concentrate compartment 59-2 via the anion-exchange membrane 56A-2.

The cleaning liquid compartment 58-1 is provided between the cation-exchange membrane 55C-1 and the anion-exchange membrane 56A-1, and the cleaning liquid compartment 58-2 is provided between the cation-exchange membrane 55C-2 and the anode 54. Those cleaning liquid compartments 58-1, 58-2 are supplied with the cleaning water 27b serving as the cleaning liquid.

The concentrate compartment 59-1 is provided between the cation-exchange membrane 55C-1 and the cathode 53, and the concentrate compartment 59-2 is provided between the anion-exchange membrane 56A-2 and the cation-exchange membrane 55C-2. The concentrate 52a is supplied to the concentrate compartment 59-2. The concentrate compartments 59-1 and 59-2 are positioned on the cathode 53 side of the cleaning liquid compartments 58-1 and 58-2 via the cation-exchange membranes 55C-1 and 55C-2, respectively. The cathode 53 and the anode 54 may be immersed in an electrode liquid.

The absorbing liquid-purification compartment 57 is connected to the absorbing liquid drawing-out line L21 through which the objective lean solution 23B is introduced, and also is connected to the purified absorption liquid-supply line L22 through which the purified lean solution 23C is drained out.

The cleaning liquid compartments 58-1 and 58-2 are individually connected to the cleaning liquid drawing-out line L23 through which the cleaning water 27b is supplied. The cleaning water-circulation line L11 is connected to the cleaning liquid-evacuation line L24, through which the cleaning water 27c is supplied from the cleaning liquid compartments 58-1 and 58-2 to the cleaning water-circulation line L11. The cleaning water 27c is mixed with the cleaning water 27a to be the cleaning water 27d, which is then supplied to the gas-cleaner 11b.

The concentrate tank 51 and the cleaning liquid compartments 58-1 and 58-2 are connected by the concentrate-circulation line L25, through which the concentrate 52a is supplied to the cleaning liquid compartments 58-1 and 58-2 and also through which the concentrate 52b is supplied to the concentrate tank 51.

The lean solution 23A is partly drawn out as the objective lean solution 23B from the lean solution-evacuation line L13 to the absorbing liquid drawing-out line L21, through which the objective lean solution 23B is supplied to the absorbing liquid-purification compartment 57 in the acidic component-remover 13A. Meanwhile, the cleaning water 27a circulating in the gas-cleaner 11b is partly supplied as the cleaning water 27b to the cleaning liquid compartments 58-1 and 58-2. The concentrate 52a in the concentrate tank 51 is supplied to the concentrate compartments 59-1 and 59-2. As described above, heat stable amine salts contained in the rich solution 22 are accumulated in the objective lean solution 23B. If containing the accumulated heat stable amine salts, the absorbing liquid shows a low pH (hydrogen ion exponent) value.

When voltage is applied between the cathode 53 and the anode 54, a heat stable amine salt (RNHX) in the objective lean solution 23B is decomposed into an amine cation ($RNH^+$) and an acidic anion ($X^-$) as shown in the following formula (3). The acidic anion ($X^-$) is attracted to the anode 54 side, and accordingly migrates from the absorbing liquid-purification compartment 57 to the concentrate compartment 59-2 through the anion-exchange membrane 56A-2. In this way, the acidic component (X) of the heat stable amine salt is removed from the objective lean solution 23B. On the other hand, the amine cation ($RNH^+$) is attracted to the cathode 53 side, but cannot permeate the anion-exchange membrane 56A-1 and hence remains in the absorbing liquid-purification compartment 57. The acidic component (X) of the heat stable amine salt in the objective lean solution 23B is thus removed in the absorbing liquid-purification compartment 57, to recover the purified lean solution 23C.

$$RNHX \rightarrow RNH^+ + X^- \quad (3)$$

Meanwhile, the cleaning waters 27a, 27b supplied to the cleaning liquid compartments 58-1 and 58-2 contain amine recovered from the $CO_2$-removed discharge gas 26a and hence are alkaline. Accordingly, hydroxyl ions ($OH^-$) therein are transferred from the cleaning liquid compartment 58-1 to the absorbing liquid-purification compartment 57 through the anion-exchange membranes 56A-1, 56A-2, and compensate the acidic component anions ($X^-$) removed from the absorbing liquid-purification compartment 57. On the other hand, since being in the form of cation ($RNH^+$), the amine is attracted to the cathode 53 side. Accordingly, the amine permeates the cation-exchange membranes 55C-1 and 55C-2 and migrates from the cleaning liquid compartments 58-1 and 58-2 to the concentrate compartments 59-1 and 59-2, respectively. In this way, the amine is removed from the cleaning water 27b. The amine and the acidic component are thus concentrated in the concentrate 52a, and thereby the concentrate 52a is converted into the concentrate 52b, which is then drained out to the concentrate-circulation line L25. The amine in the cleaning water 27b is thus removed in the cleaning liquid compartments 58-1 and 58-2, to recover the amine-recovering ability of the cleaning water 27b.

After the acidic components of the heat stable amine salts are removed, the purified lean solution 23C is returned to the lean solution 23A through the purified absorption liquid-supply line L22. Meanwhile, after the amine-recovering ability is recovered in the cleaning liquid compartments 58-1 and 58-2, the cleaning water 27b is drained out from the cleaning liquid-evacuation line L24. The concentrate 52b is returned to the concentrate tank 51 from the concentrate compartments 59-1 and 59-2 through the concentrate-circulation line L25. Purified absorption liquid-supply line L22 may be connected to a location other than lean solution 23A, such as, for example, rich solution-supply line L12.

The apparatus may be provided with a first storage tank between the absorbing liquid drawing-out line L21 and the absorbing liquid-purification compartment 57. The lean solution 23B is stored temporally in the first storage tank, and then supplied to the absorbing liquid-purification compartment 57. Further, the purified absorption liquid-supply line L22 and the first storage tank may be connected by a line through which the purified lean solution 23C is returned to the first storage tank. Furthermore, the first storage tank and the lean solution-evacuation line L13 may be connected by a line through which the lean solution 23B stored in the first storage tank is partly or fully supplied continuously or intermittently to the lean solution-evacuation line L13 so as to be mixed with the lean solution 23A.

The apparatus may be also provided with a second storage tank between the cleaning liquid drawing-out line L23 and the cleaning liquid compartments 58-1 and 58-2. The cleaning water 27b is stored temporally in the second storage tank, and then supplied to the cleaning liquid compartments 58-1 and 58-2. Further, the cleaning liquid-evacuation line L24 and the second storage tank may be connected by a line through which the cleaning water 27c drained out from the cleaning liquid compartments 58-1 and 58-2 is returned to the second storage tank. Furthermore, the second storage tank and the cleaning water-circulation line L11 may be connected by a line through which the cleaning water 27b stored in the second storage tank is partly or fully supplied continuously or intermittently to the cleaning water-circulation line L11 so as to be mixed with the cleaning water 27a.

The objective lean solution 23B and the cleaning water 27b are supplied to the absorbing liquid-purification compartment 57 and to the cleaning liquid compartment 58-1 or 58-2, respectively. The objective lean solution 23B and the cleaning water 27b may be only once or plural times made to pass through the absorbing liquid-purification compartment 57 and through the cleaning liquid compartment 58-1 or 58-2, respectively.

In the present embodiment, only the cleaning water 27b is supplied as the cleaning liquid to the cleaning liquid compartments 58-1 and 58-2. However, the apparatus is not limited to that embodiment. Specifically, pure water and aqueous solutions may be introduced from the outside and supplied together with the cleaning water 27b to the cleaning liquid compartments 58-1 and 58-2 as the cleaning liquid. The aqueous solutions must be capable of dissolving acids and amines, and needs to provide electroconductivity for enhancing the current efficiency. In view of that, it is preferred to adopt aqueous solutions containing acids, alkalis or salts dissolved therein.

The cation-exchange membranes 55C-1, 55C-2 and the anion-exchange membranes 56A-1, 56A-2, which are used in the acidic component-remover 13A, are liable to deteriorate at a high temperature. Accordingly, the temperature of the cleaning water 27b is preferably the same as or lower than that of the objective lean solution 23B, and is preferably 40° C. or below.

As shown in FIG. 1, the purified lean solution 23C discharged from the acidic component-remover 13A is introduced to the lean solution-evacuation line L13, mixed with the lean solution 23A, and then supplied to the absorption tower 11 as the mixed lean solution 23D.

According to the present embodiment, amine contained in the cleaning water 27b can be thus removed in the cleaning liquid compartments 58-1 and 58-2 and thereby the acidic component-remover 13A can fulfill the function of reducing the amine concentration in the cleaning water 27b. Hence, it can be realized to lower the pH value of the cleaning water 27c drained out from the acidic component-remover 13A. In this way, the cleaning water 27c is introduced through the cleaning liquid-evacuation line L24 into the cleaning water-circulation line L11 and mixed with the cleaning water 27a to be the cleaning water 27d, so that the pH value of the cleaning water 27d can be reduced enough to recover the amine-recovering ability of the cleaning water 27a. As a result, the amine-cleaning efficiency can be improved in the gas-cleaner 11b.

Also, according to the present embodiment, it can be realized in the absorbing liquid-purification compartment 57 of the acidic component-remover 13A to remove acidic components of heat stable amine salts contained in the objective lean solution 23B. While the lean solution 23A serving as the absorption liquid is kept circulating in the inner system, heat stable amine salts and the like are accumulated in the lean solution 23A. However, the acidic components of heat stable amine salts are thus removed from the objective lean solution 23B, which is then mixed again with the lean solution 23A and reused. In this way, it can be realized to remove acidic components of heat stable amine salts accumulated in the lean solution 23A. As a result, the $CO_2$-absorption efficiency can be improved in the $CO_2$-absorption unit 11a.

According to the prior art, both the gas-cleaner and the acidic component-remover individually need to be supplied with water or chemicals (e.g., aqueous solutions of sulfuric acid and the like). Further, it is also necessary to treat the effluent water or chemicals used in the gas-cleaner and the acidic component-remover. In contrast, according to the present embodiment, the cleaning water 27a supplied to the gas-cleaner 11b is partly introduced into the acidic component-remover 13A, so as to disuse or reduce the water or chemicals employed in the acidic component-remover 13A for removing heat stable amine salts from the objective lean solution 23B. This also can suppress expansion of the effluent treatment facility.

According to the present embodiment, it is also possible to remove heat stable amine salts and the like accumulated in the objective lean solution 23B without adding chemicals such as hydroxides of alkali metals (e.g., sodium) in the acidic component-remover 13A. If alkali metal hydroxides are added to the objective lean solution 23B, impurities such as salts other than the heat stable amine salts may be formed to increase salts in the absorption liquid and consequently the apparatus may corrode and/or the impurities may precipitate. In contrast, since it is unnecessary in the present embodiment to incorporate alkali metal hydroxides into the objective lean solution 23, it can be realized to dispense with a work for removing the above impurities. It is hence easy to remove heat stable amine salts and the like accumulated in the objective lean solution 23B.

As described above, since the acidic gas recovery apparatus 10A comprises the acidic component-remover 13A, it is possible to recover the amine-recovering ability of the cleaning water 27b used in the gas-cleaner 11b and thereby to keep the amine-recovering efficiency of the gas-cleaner 11b and further it is also possible to stabilize the performance of absorbing $CO_2$ from the discharge gas 21 in the absorption tower 11. Furthermore, since the cleaning water 27a supplied to the gas-cleaner 11b is partly used in the acidic component-remover 13A, it is possible to reduce water or chemicals used there. Accordingly, the effluent treatment facility can be kept from expanding and hence the cost for the apparatus can be prevented from increasing. Still further, since the mixed lean solution 23D containing heat stable amine salts in a low concentration is circulated in the inner system between the absorption tower 11 and the regeneration tower 12, the acidic gas recovery apparatus 10A is prevented from undergoing internal corrosion or damage and hence can be stably operated. The acidic gas recovery apparatus 10A thus makes it possible to efficiently reduce the emission of amine to the environment.

Figure 3:
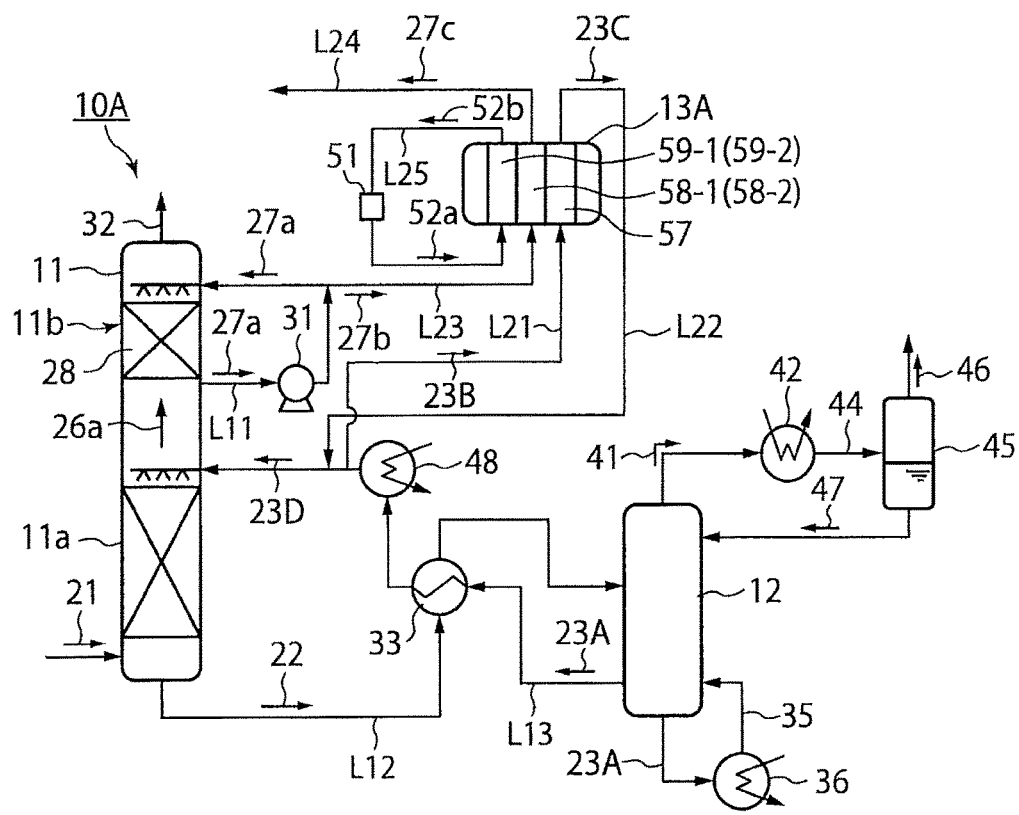
FIG. 3 schematically shows an example of another structure of the acidic gas recovery apparatus.

In the present embodiment, the cleaning water 27c discharged from the acidic component-remover 13A is transferred through the cleaning liquid-evacuation line L24 to the gas-cleaner 11b and reused there. However, the amine concentration in the cleaning water 27c is lower than that in the cleaning water 27b, and hence the cleaning water 27c may be directly drained out to the outside, for example, as shown in FIG. 3.

Figure 4:
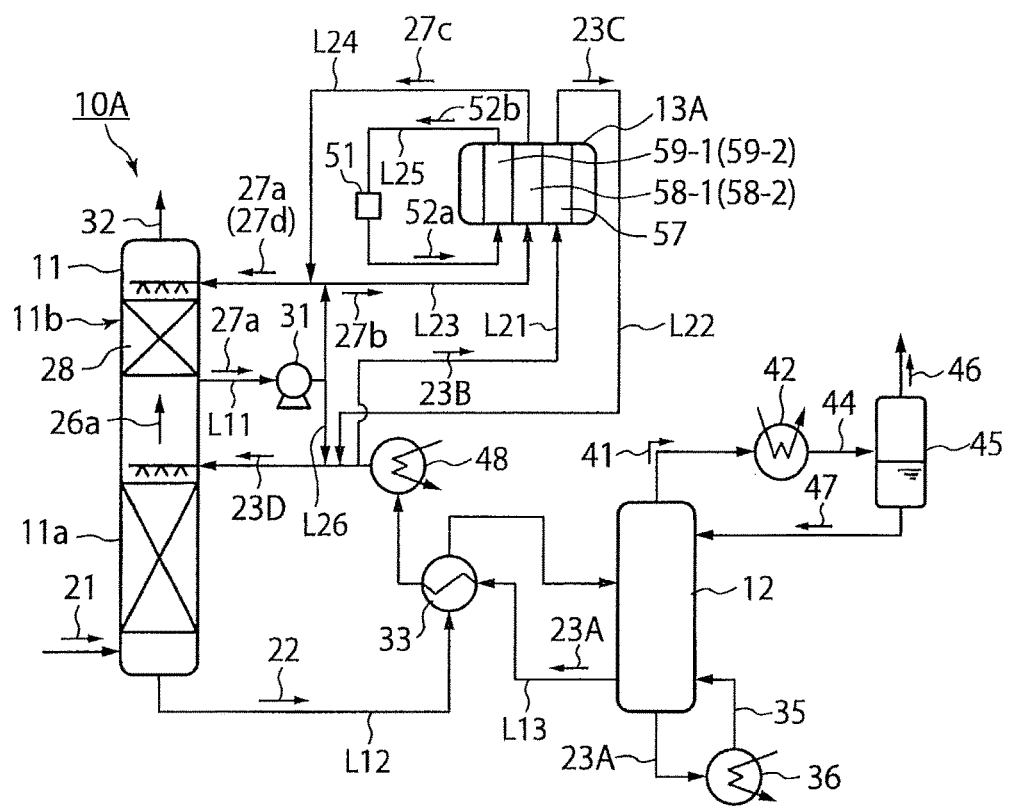
FIG. 4 schematically shows an example of another structure of the acidic gas recovery apparatus according the first embodiment.

Also in the present embodiment, the cleaning water 27a is circulated in the cleaning water-circulation line L11 while the cleaning water 27b is partly supplied to the cleaning liquid drawing-out line L23. However, the cleaning water 27a contains amine. In view of that, as shown in FIG. 4, the cleaning water-circulation line L11 and the lean solution-evacuation line L13 may be connected by a cleaning water-intake line L26, through which the cleaning water 27a circulating in the cleaning water-circulation line L11 is mixed with the mixed lean solution 23D so that amine in the cleaning water 27a can be utilized to absorb $CO_2$ in the discharge gas 21. Furthermore, cleaning water 27a circulating in the cleaning water-circulation line L11 may be supplied to $CO_2$-absorption unit 11a.

Second Embodiment

The acidic gas recovery apparatus according to a second embodiment will be described with reference to the drawings. The same number or sign will be applied to a member having the same function as that in the embodiment described above, and the detailed description thereof will be omitted. The present embodiment is the same as the first embodiment except for the structure of the acidic component-remover, and therefore only the structure of the acidic component-remover will be explained with reference to the drawings. In the acidic gas recovery apparatus of the present embodiment, the acidic component-remover comprises bipolar membranes in place of the cation-exchange membranes.

Figure 5:
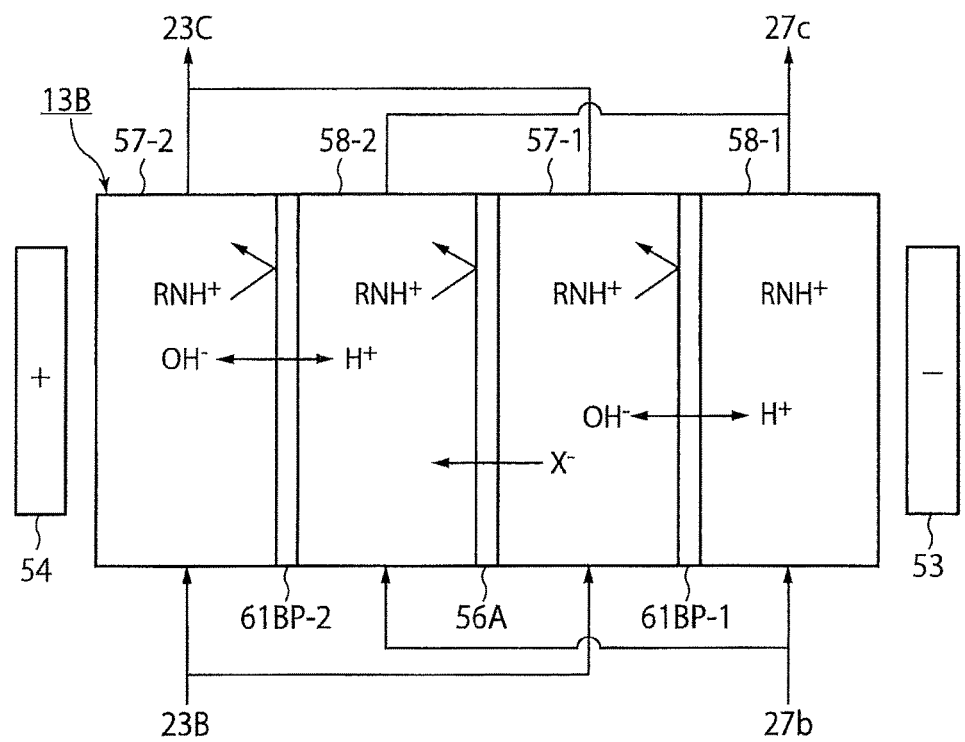
FIG. 5 schematically shows a structure of the acidic component-remover in the acidic gas recovery apparatus according a second embodiment.

FIG. 5 schematically shows the structure of the acidic component-remover. As shown in FIG. 5, the acidic component-remover 13B comprises a cathode 53, an anode 54, bipolar membranes 61BP-1 and 61BP-2, and an anion-exchange membranes 56A. The acidic component-remover 13B is divided in such two areas as are absorbing liquid-purification compartments 57-1, 57-2 and cleaning liquid compartments 58-1, 58-2. Those compartments are separated with the anion-exchange membranes 56A and the bipolar membranes 61BP-1 and 61BP-2. The membranes are provided between the cathode 53 and the anode 54, and are aligned in the order of the bipolar membrane 61BP-1, the anion-exchange membrane 56A, and the bipolar membrane 61BP-2 from the cathode 53 side to the anode 54 side. Accordingly, in the present embodiment, the acidic component-remover 13B comprises four compartments separated with the bipolar membranes 61BP-1, 61BP-2 and the anion-exchange membrane 56A, and the compartments are aligned in the order of the cleaning liquid compartment 58-1, the absorbing liquid-purification compartment 57-1, the cleaning liquid compartment 58-2, and the absorbing liquid-purification compartment 57-2 from the cathode 53 side to the anode 54 side. Specifically, the four compartments, namely, the cleaning liquid compartment 58-1, the absorbing liquid-purification compartment 57-1, the cleaning liquid compartment 58-2 and the absorbing liquid-purification compartment 57-2 are so provided between the cathode 53 and the anode 54 that the inside of each compartment can be individually impressed with voltage via at least one membrane. In the present embodiment, the acidic component-remover 13B comprises two pairs of the absorbing liquid-purification compartments and cleaning liquid compartments. However, it may comprise one pair of them or plural pairs of them.

The bipolar membranes 61BP-1 and 61BP-2 are composite films in which anion-exchange membranes and cation-exchange membranes are laminated. In the presence of water, the bipolar membranes are provided so that the anion-exchange membranes and the cation-exchange membranes may be on the anode side and on the cathode side, respectively. Examples of the anion-exchange membranes and the cation-exchange membranes are the same as those described in the first embodiment.

The absorbing liquid-purification compartments 57-1 and 57-2 are supplied with the objective lean solution 23B.

The absorbing liquid-purification compartment 57-1 is provided between the bipolar membrane 61BP-1 and the anion-exchange membrane 56A, and is positioned on the anode 54 side of the cleaning liquid compartment 58-1 via the bipolar membrane 61BP-1. Further, the absorbing liquid-purification compartment 57-1 is sandwiched between the cleaning liquid compartments 58-1 and 58-2. The anion-exchange membrane 56A is positioned on the anode 54 side of the absorbing liquid-purification compartment 57-1.

The absorbing liquid-purification compartment 57-2 is provided between the bipolar membrane 61BP-2 and the inner wall, and is positioned on the anode 54 side of the cleaning liquid compartment 58-2 via the bipolar membrane 61BP-2.

The absorbing liquid-purification compartments 57-1 and 57-2 are supplied with the objective lean solution 23B while the cleaning liquid compartments 58-1 and 58-2 are supplied with the cleaning water 27b.

When voltage is applied between the electrodes, the anionic acidic component ($X^-$) of heat stable amine salt in the objective lean solution 23B is attracted to the anode 54 side in the absorbing liquid-purification compartments 57-1 and 57-2. The acidic component ($X^-$) of heat stable amine salt in the absorbing liquid-purification compartment 57-1 then migrates from the absorbing liquid-purification compartment 57-1 to the cleaning liquid compartment 58-2 though the anion-exchange membrane 56A. As a result, the acidic component ($X^-$) of the heat stable amine salt is removed from the objective lean solution 23B.

Meanwhile, when voltage is applied between the electrodes, water in the bipolar membranes 61BP-1 and 61BP-2 undergoes electrolysis and the resultant hydrogen ions and hydroxyl ions migrate to the cation-exchange membrane side (cathode 53 side) and to the anion-exchange membrane side (anode 54 side), respectively, in the bipolar membranes 61BP-1 and 61BP-2. Consequently, the hydroxyl ions move from the bipolar membranes 61BP-1 and 61BP-2 to the absorbing liquid-purification compartments 57-1 and 57-2 while the hydrogen ions move from the bipolar membranes 61BP-1 and 61BP-2 to the cleaning liquid compartments 58-1 and 58-2. The hydroxyl ions can be thus transferred to the absorbing liquid-purification compartments 57-1 and 57-2. Also, since the hydrogen ions are transferred to the cleaning water 27b, the pH value of the cleaning water 27b can be lowered.

The purified lean solution 23C is drained out from the acidic component-remover 13B, and then returned to the lean solution 23A (see, FIG. 1) through the purified absorption liquid-supply line L22 (see, FIG. 1). Meanwhile, the cleaning water 27c is drained out from the acidic component-remover 13B, transferred through the cleaning liquid-evacuation line L24 (see, FIG. 1) and mixed with the cleaning water 27a (see, FIG. 1) flowing in the cleaning water-circulation line L11 (see, FIG. 1). The drained cleaning water 27c (see, FIG. 1) contains accumulated acidic components of heat stable amine salts.

According to the present embodiment, the acidic component ($X^-$) of heat stable amine salt contained in the objective lean solution 23B is transferred to the cleaning water 27b in the cleaning liquid compartments 58-1 and 58-2 and thereby the acidic component-remover 13B can fulfill the function of lowering the pH value of the cleaning water 27b. The cleaning water 27b is suppled through the cleaning liquid-evacuation line L24 to the cleaning water-circulation line L11, and mixed with the cleaning water 27a. In this way, the pH value of the cleaning water 27c can be lowered enough to recover the amine-recovering ability of the cleaning water 27c. As a result, the amine-cleaning efficiency can be improved in the gas-cleaner 11b.

Also, according to the present embodiment, acidic components of heat stable amine salts can be removed from the objective lean solution 23B in the absorbing liquid-purification compartments 57-1 and 57-2 of the acidic component-remover 13B. After the acidic components of heat stable amine salts are thus removed from the objective lean solution 23B to lower the concentration thereof in the acidic component-remover 13B, the purified lean solution 23C is supplied through the purified absorption liquid-supply line L22 to the lean solution-evacuation line L13 and mixed with the lean solution 23A. The purified lean solution 23C is thus mixed again with the lean solution 23A and reused, and thereby it can be realized to reduce the concentration of acidic components of heat stable amine salts in the mixed lean solution 23D and hence to recover the $CO_2$-absorption performance of the mixed lean solution 23D.

In the present embodiment, if pure water is adopted as the liquid supplied to the cleaning liquid compartments 58-1 and 58-2, the supplied liquid has such low electroconductivity as to lower the current efficiency of electrodialysis carried out in the acidic component-remover 13B. Accordingly, it is known to add acids, alkalis or salts for providing electroconductivity. Actually, however, the objective lean solution 23B in the absorbing liquid-purification compartments 57-1 and 57-2 contains amine, acidic components of heat stable amine salts, and hydroxyl ions and also the cleaning water 27b in the cleaning liquid compartments 58-1 and 58-2 contains amine and hydroxyl ions, and hence they necessarily have electroconductivity. It is therefore unnecessary to incorporate the additives, such as acids, alkalis or salts, for providing electroconductivity to the objective lean solution 23B and the cleaning water 27b when they are subjected to electrodialysis in the acidic component-remover 13B. The acidic components of heat stable amine salts can be thus removed from the objective lean solution 23B without adding the additives or by adding a reduced amount of the additives.

Further in the present embodiment, the cleaning water 27a used in the gas-cleaner 11b is partly supplied to the acidic component-remover 13B, so as to disuse or reduce water or chemicals mixed with the cleaning water 27a in the acidic component-remover 13B for removing heat stable amine salts from the objective lean solution 23B. This also can suppress expansion of the effluent treatment facility for the water and chemicals.

According to the present embodiment, it also becomes possible in the acidic component-remover 13B to remove acidic components of heat stable amine salts from the objective lean solution 23B without adding therein chemicals such as hydroxides of alkali metals, such as, sodium. Accordingly, there is no fear of forming impurities, such as, salts other than the heat stable amine salts, when alkali metal hydroxides are added to the objective lean solution 23B. The present embodiment therefore dispenses with a work for removing the above impurities, and hence it is easy to remove heat stable amine salts and the like accumulated in the objective lean solution 23B.

As described above, since the acidic gas recovery apparatus comprises the acidic component-remover 13B, it is possible to recover the amine-recovering ability of the cleaning water 27a used in the gas-cleaner 11b and thereby to keep the amine-cleaning efficiency of the gas-cleaner 11b and further it is also possible to stabilize the performance of absorbing $CO_2$ from the discharge gas 21 in the absorption tower 11. In addition, since the objective lean solution 23B and the cleaning water 27b necessarily have electroconductivity in the absorbing liquid-purification compartments 57-1, 57-2 and in the cleaning liquid compartments 58-1, 58-2, respectively, they can be subjected to electrodialysis in the acidic component-remover 13B without addition of the additives. Further, since the cleaning water 27a used in the gas-cleaner 11b is partly employed in the acidic component-remover 13B, it is possible to reduce the consumed amount of water or chemicals and to suppress expansion of the effluent treatment facility. As a result, the cost for the apparatus can be prevented from increasing. Furthermore, the cleaning water 27c discharged from the acidic component-remover 13B is reused, so that it can be realized to reduce the disposal amount of the cleaning water 27b and to prevent amine contained in the cleaning water 27b from leaking out to the outside. Still furthermore, since the mixed lean solution 23D containing heat stable amine salts in a low concentration is circulated in the inner system between the absorption tower 11 and the regeneration tower 12, the acidic gas recovery apparatus 10A is prevented from undergoing internal corrosion or damage and hence can be stably operated.

Third Embodiment

The acidic gas recovery apparatus according to a third embodiment will be described with reference to the drawings. The same number or sign will be applied to a member having the same function as that in the embodiment described above, and the detailed description thereof will be omitted.

Figure 6:
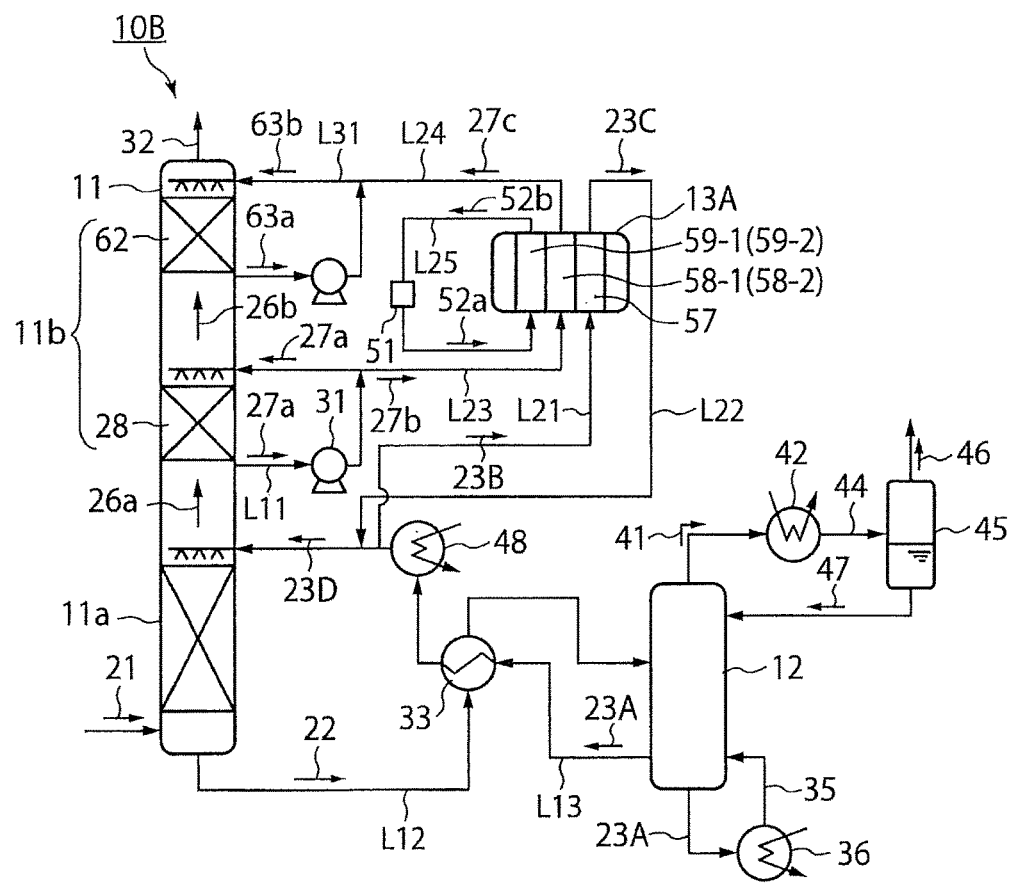
FIG. 6 schematically shows a structure of the acidic gas recovery apparatus according a third embodiment.

FIG. 6 schematically shows a structure of the acidic gas recovery apparatus according the third embodiment. As shown in FIG. 6, in the acidic gas recovery apparatus 10B, the gas-cleaner 11b comprises an acid-cleaner 62 in addition to the water-cleaner 28. The cleaning liquid-evacuation line L24 is connected to a cleaning acid-circulation line L31 through which a cleaning acid 63a is supplied to the acid-cleaner 62. Here, the "cleaning acid" means a second cleaning liquid having a pH value lower than the cleaning water 27a, which is the first cleaning liquid used in the water-cleaner 28. The cleaning acid is, for example, an acidic aqueous solution having a pH value of 7 or less. Examples of the acidic aqueous solution include aqueous solutions of sulfuric acid, acetic acid and nitric acid.

In the present embodiment, the acidic component-remover 13A is employed to remove the acidic components. For supplying the cleaning water 27a used in the water-cleaner 28, it is preferred to adopt the acidic component-remover 13A shown in FIG. 3. On the other hand, for supplying the cleaning acid 63a used in the acid-cleaner 62, it is preferred to adopt the acidic component-remover 13B shown in FIG. 5. In the present embodiment, the cleaning water 27a is used as the cleaning liquid and hence the acidic component-remover 13A is employed. However, the acidic component-remover 13B can be employed as well as the acidic component-remover 13A in the present embodiment.

In the acid-cleaner 62, the $CO_2$-removed discharge gas 26b discharged from the water-cleaner 28 is washed with the cleaning acid 63 having a lower pH value than the cleaning water 27a. The acid-cleaner 62 is provided above the water-cleaner 28, namely, on the downstream side of the water-cleaner 28 along the flow of the $CO_2$-removed discharge gas 26b in the absorption tower 11. The acid-cleaner 62 is equipped with a spray nozzle on the top. From the spray nozzle, the cleaning acid 63b supplied to the absorption tower 11 is scatteringly showered down to the acid-cleaner 62. In the acid-cleaner 62, the $CO_2$-removed discharge gas 26b is washed with the cleaning acid 63b to remove amine remaining in the $CO_2$-removed discharge gas 26b. It thus becomes possible to recover amine and the like left unrecovered in the water-cleaner 28 and thereby to enhance the recovering yield.

The cleaning acid 63 is, for example, stored in a cleaning acid-tank (not shown) provided in the lower area of the acid-cleaner 62. The cleaning acid-tank is connected to a cleaning acid-circulation line L31. The cleaning acid 63a is pressurized by a circulation pump 64 installed in the cleaning acid-circulation line L31, and returned into the tower from the upper area of the acid-cleaner 62.

The pH value of the cleaning acid 63a can be shifted to the acidic side (the pH value of the cleaning acid 63a can be lowered). For the purpose of that, acidic solutions may be introduced from the outside to the cleaning acid-circulation line L31 and/or the mine concentration in the cleaning acid 63a may be made lower than that in the cleaning water 27a.

The cleaning liquid-evacuation line L24 is connected to the cleaning acid-circulation line L31, so that the cleaning water 27c drained out from the acidic component-remover 13A is mixed with the cleaning acid 63a. In the present embodiment, the cleaning water 27a is used as the cleaning liquid, and the cleaning water 27c drained out from the acidic component-remover 13A is mixed with the cleaning acid 63a and then supplied as the cleaning acid 63b to the acid-cleaner 62. The cleaning water 27c used as the cleaning liquid is thus utilized as the cleaning acid 63b together with the cleaning acid 63a so that amine remaining in the $CO_2$-removed discharge gas 26b can be recovered in the acid-cleaner 62.

As described above, also in the acidic gas recovery apparatus 10B, the cleaning water 27c used as the cleaning liquid can be effectively used together with the cleaning acid 63a for recovering amine remaining in the $CO_2$-removed discharge gas 26b in the acid-cleaner 62.

Although included in the absorption tower 11 in the present embodiment, the water-cleaner 28 and the acid-cleaner 62 may be installed outside of the absorption tower 11 to be a gas-cleaning tower independent from the absorption tower 11.

Fourth Embodiment

The acidic gas recovery apparatus according to a fourth embodiment will be described with reference to the drawings. The same number or sign will be applied to a member having the same function as that in the embodiment described above, and the detailed description thereof will be omitted.

Figure 7:
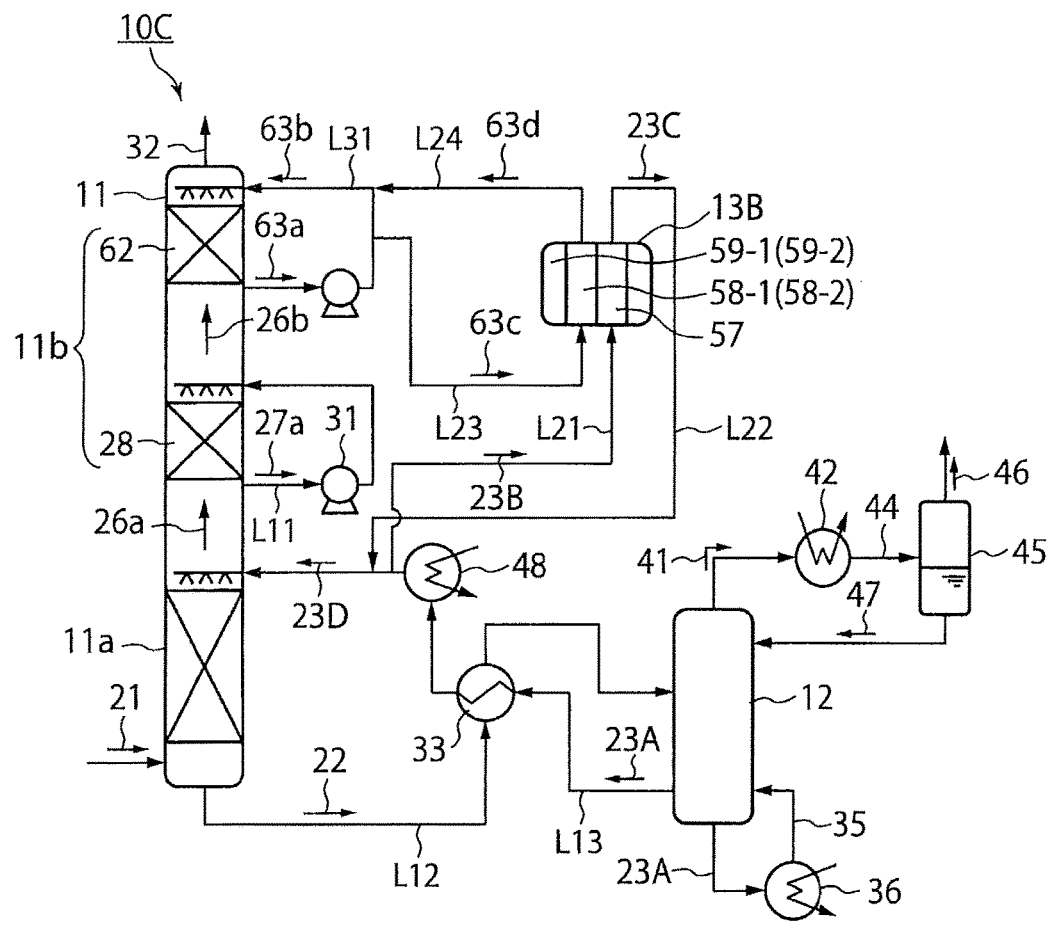
FIG. 7 schematically shows a structure of the acidic gas recovery apparatus according a fourth embodiment.

FIG. 7 schematically shows a structure of the acidic gas recovery apparatus according the fourth embodiment. As shown in FIG. 7, the acidic gas recovery apparatus 10C is the same as the acidic gas recovery apparatus 10B shown in FIG. 6 according the third embodiment except that the line into which the cleaning liquid drawing-out line L23 diverges is changed from the cleaning water-circulation line L11 to the cleaning acid-circulation line L31 and that the cleaning liquid supplied to the acidic component-remover 13A is changed from the cleaning water 27a to the cleaning acid 63a. In the present embodiment, since the cleaning acid 63a is used as the cleaning liquid in the acid-cleaner 62, the acidic component-remover 13B shown in FIG. 5 is employed to remove the acidic components.

The cleaning liquid drawing-out line L23 is connected to the cleaning acid-circulation line L31, so that the cleaning acid 63a discharged from the acid-cleaner 62 is partly drawn out as the cleaning acid 63c through the cleaning liquid drawing-out line L23 and supplied to the acidic component-remover 13B. The cleaning acid 63d drained out from the acidic component-remover 13B is mixed with the cleaning acid 63a flowing to the acid-cleaner 62, and then supplied as the cleaning acid 63d to the acid-cleaner 62. The cleaning acid 63c used as the cleaning liquid is thus utilized together with the cleaning acid 63a so that amine remaining in the $CO_2$-removed discharge gas 26b can be recovered in the acid-cleaner 62.

As described above, also in the acidic gas recovery apparatus 10C, the cleaning acid 63d used in the acidic component-remover 13B can be effectively used together with the cleaning acid 63a in the acid-cleaner 62 for recovering amine remaining in the $CO_2$-removed discharge gas 26b.

In the present embodiment, only the cleaning acid 63c is supplied as the cleaning liquid to the cleaning liquid compartments 58-1 and 58-2. However, the apparatus is not limited to that embodiment. Specifically, acid-replenishing solutions may be introduced from the outside and supplied together with the cleaning acid 63c to the cleaning liquid compartments 58-1 and 58-2 as the cleaning liquid. The acid-replenishing solutions must be aqueous solutions capable of dissolving acids, and needs to provide electro-conductivity for enhancing the current efficiency. In view of that, it is preferred to adopt aqueous solutions containing acids, alkalis or salts dissolved therein.

Figure 8:
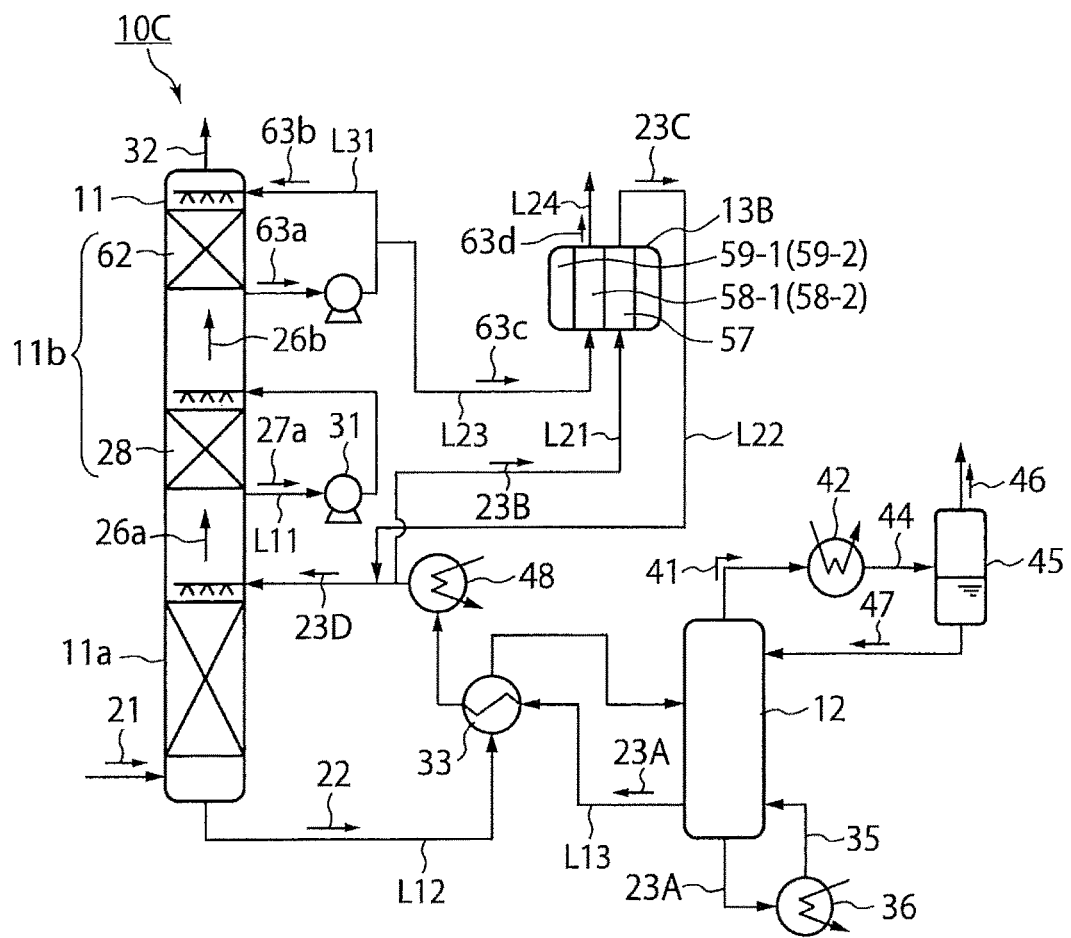
FIG. 8 schematically shows an example of another structure of the acidic gas recovery apparatus.

Also in the present embodiment, the cleaning liquid-evacuation line L24 is connected to the cleaning acid-circulation line L31 so that the cleaning acid 63d discharged from the acidic component-remover 13B can be reused in the acid-cleaner 62d. However, the amine concentration in the cleaning acid 63d is lower than that in the cleaning acid 63c, and hence the cleaning acid 63d may be directly drained out from the cleaning acid-circulation line L31 to the outside, for example, as shown in FIG. 8.

Fifth Embodiment

The acidic gas recovery apparatus according to a fifth embodiment will be described with reference to the drawings. The same number or sign will be applied to a member having the same function as that in the embodiment described above, and the detailed description thereof will be omitted.

Figure 9:
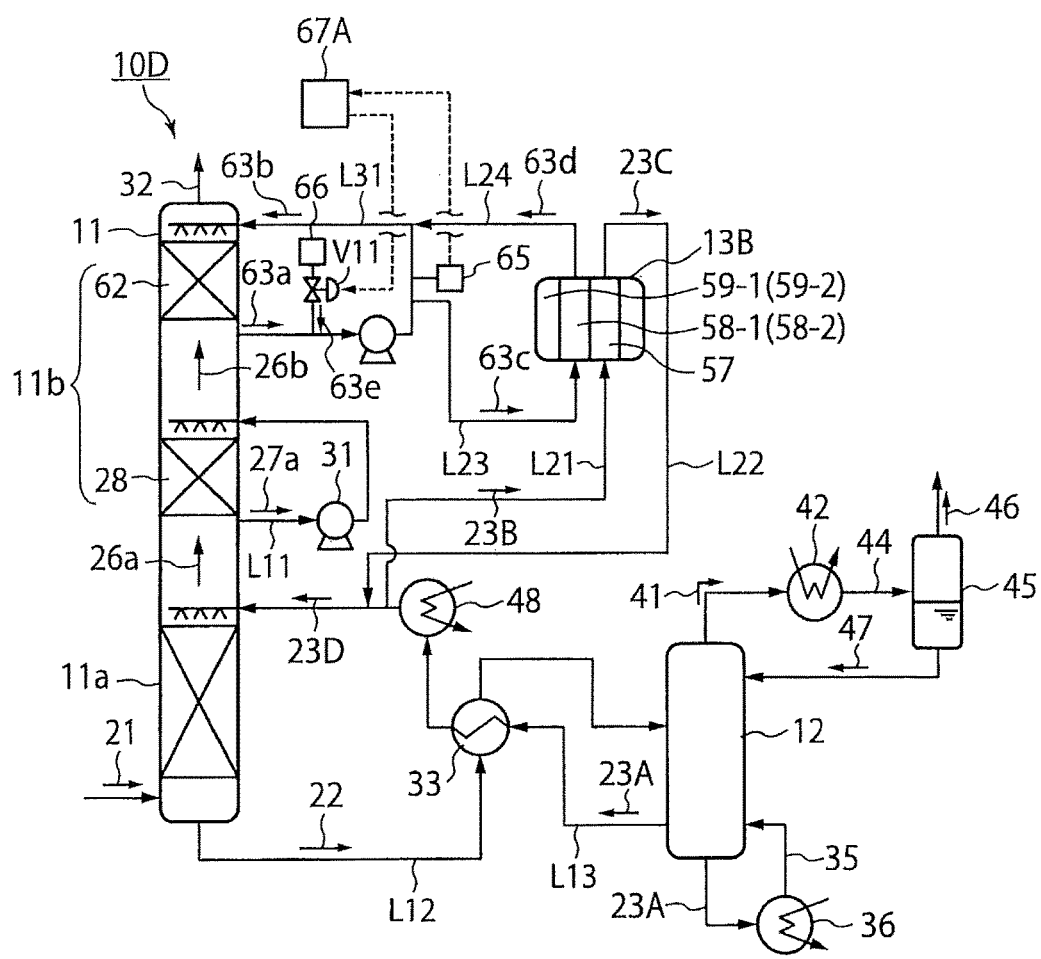
FIG. 9 schematically shows a structure of the acidic gas recovery apparatus according a fifth embodiment.

FIG. 9 schematically shows a structure of the acidic gas recovery apparatus according the fifth embodiment. As shown in FIG. 9, the acidic gas recovery apparatus 10D is the same as the acidic gas recovery apparatus 10C shown in FIG. 7 according the fourth embodiment except for additionally comprising a pH-meter 65 for measuring the pH value of the cleaning acid 63a used in the acid-cleaner 62, a cleaning acid-supply 66 for supplying a fresh cleaning acid 63e to the cleaning acid-circulation line L31, a controller 67A, and a control valve V11.

The pH-meter 65 is installed in the cleaning acid-circulation line L31 so as to measure the pH value of the cleaning acid 63a flowing through the cleaning acid-circulation line L31. The pH-meter 65 is. for example, a pH meter.

The controller 67A is connected to the pH-meter 65, the control valve V11 and other members constituting the $CO_2$-recovery apparatus 10, and has a function of controlling the aperture of the control valve V11 in accordance with the measured result given by the pH-meter 65. The controller 67A comprises, for example, a memory bank for storing a control program and various memory information, and a calculating means working according to the control program. In the controller 67A, the memory bank is beforehand stored with a map or the like of the relation between the pH value of the cleaning acid 63a and the efficiency of recovering amine from the $CO_2$-removed discharge gas 26b.

When the measured result is sent from the pH-meter 65 to the controller 67A, the controller 67A controls the aperture of the control valve V11 in accordance with the pH value of the cleaning acid 63a measured in the pH-meter 65 so that the cleaning acid 63e in an adequate amount can flow into the cleaning acid-circulation line L31 from the cleaning acid-supply 66. If the cleaning acid 63e is newly suppled to the cleaning acid-circulation line L31, the cleaning acid 63a flowing in the cleaning acid-circulation line L31 is preferably drained out to the outside in the amount of the newly supplied cleaning acid 63e.

According to the present embodiment, the cleaning acid 63d discharged from the acidic component-remover 13A is supplied to the cleaning acid-circulation line L31 and used in the acid-cleaner 62 and also the cleaning acid 63e is newly suppled to the cleaning acid-circulation line L31 in accordance with the pH value of the cleaning acid 63a, and thereby the amine-recovering ability of the cleaning acid 63e can be stably recovered and accordingly the amine-recovering performance in the acid-cleaner 62 can be stably maintained or improved.

In the present embodiment explained above, the cleaning acid 63e is newly suppled to the cleaning acid-circulation line L31. However, the pH-meter 65 may be installed in the cleaning water-circulation line L11 so as to measure the pH value of the cleaning acid 27a flowing through the cleaning water-circulation line L11, and the cleaning water may be newly supplied to the cleaning water-circulation line L11 in accordance with the measured pH value. In that case, while the pH value of the cleaning water 27a flowing through the cleaning water-circulation line L11 and that of the cleaning acid 63a flowing through the cleaning acid-circulation line L31 are individually kept constant, the pH value of the cleaning acid 63a is kept lower than that of the cleaning water 27a so as to stabilize the performance of recovering amine from the $CO_2$-removed discharge gas 26b.

Sixth Embodiment

The acidic gas recovery apparatus according to a sixth embodiment will be described with reference to the drawings. The same number or sign will be applied to a member having the same function as that in the embodiment described above, and the detailed description thereof will be omitted.

Figure 10:
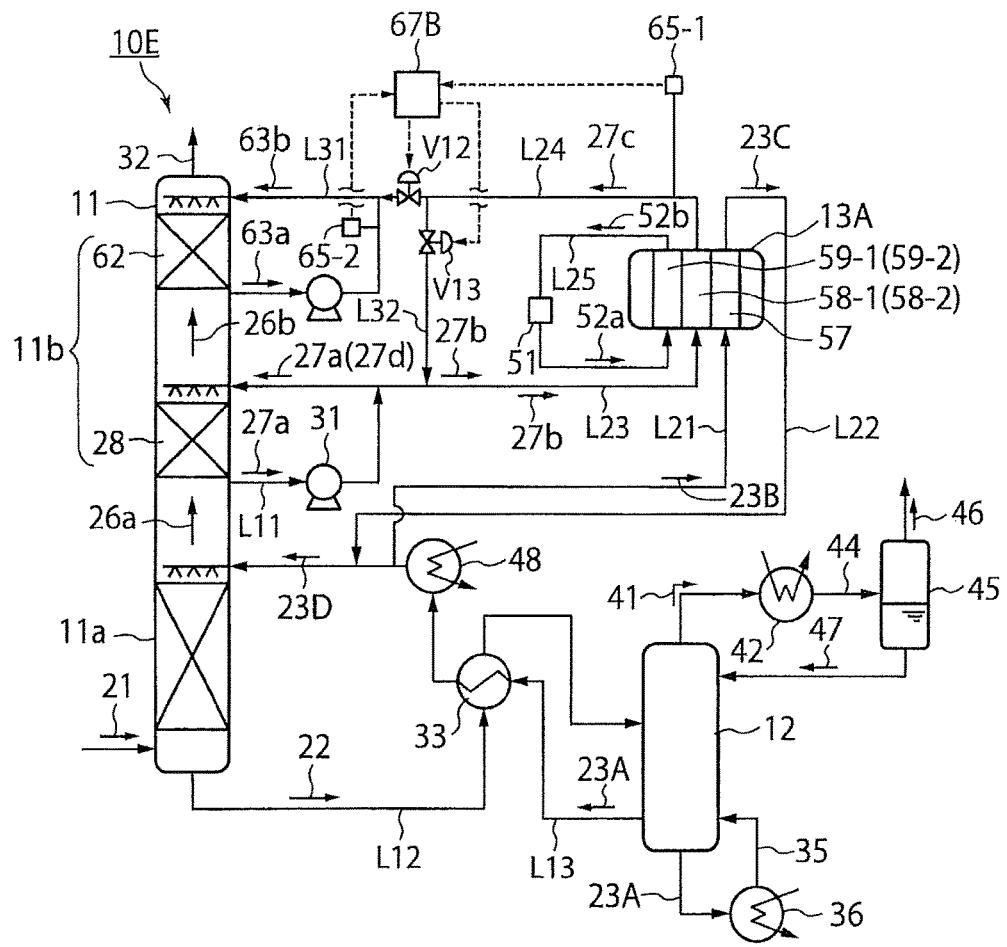
FIG. 10 schematically shows a structure of the acidic gas recovery apparatus according a sixth embodiment.

FIG. 10 schematically shows a structure of the acidic gas recovery apparatus according the sixth embodiment. As shown in FIG. 10, the acidic gas recovery apparatus 10E is the same as the acidic gas recovery apparatus 10B shown in FIG. 6 according the third embodiment except for additionally comprising a pH-meter 65-1 for measuring the pH value of the cleaning liquid 27c discharged from the acidic component-remover 13A, another pH-meter 65-2 for measuring the pH value of the cleaning acid 63a used in the acid-cleaner 62, a controller 67B, control valves V12 and V13, and a circulation line L32.

The pH-meter 65-1 is installed in the cleaning liquid-evacuation line L24 to measure the pH value of the cleaning liquid 27c discharged from the acidic component-remover 13A. The pH-meter 65-2 is installed in the cleaning acid-circulation line L31 to measure the pH value of the cleaning acid 63a flowing through the cleaning acid-circulation line L31. The pH-meters 65-1 and 65-2 are. for example, pH meters.

The controller 67B is connected to the pH-meters 65-1, 65-2, the control valves V12, V13 and other members constituting the $CO_2$-recovery apparatus 10, and has a function of controlling the flow passing through the control valve V12 in accordance with the measured results given by the pH-meters 65-1 and 65-2. Like the controller 67A, the controller 67B can comprise a memory bank, a calculating means and the like. In the controller 67B, the memory bank is beforehand stored with a map or the like of the relation between the pH value of the cleaning acid 63a and the efficiency of recovering amine from the $CO_2$-removed discharge gas 26b.

The valves V12 and V13 are installed in the cleaning liquid-evacuation line L24 and in the cleaning acid-circulation line L31, respectively. The aperture of the valve V12 or V13 is so controlled that an adequate amount of the cleaning water 27c discharged from the acidic component-remover 13A can flow into the acid-cleaner 62 or into the acidic component-remover 13A, respectively.

The circulation line L32 serves as a line through which the cleaning water 27c discharged from the acidic component-remover 13A circulate from the cleaning liquid-evacuation line L24 to the absorbing liquid drawing-out line L21.

When the measured results are sent from the pH-meters 65-1 and 65-2 to the controller 67B, the controller 67B controls the apertures of the control valves V12 and V13 in accordance with the pH value of the cleaning water 27c measured in the pH-meter 65-1 and with that of the cleaning acid 63a measured in the pH-meter 65-2 so that the cleaning water 27c in an adequate amount can flow into the acid-cleaner 62 or into the acidic component-remover 13A. The cleaning water 27c may be supplied to only one of or both of the acid-cleaner 62 and the acidic component-remover 13A.

Specifically, in the present embodiment, when receiving the measured result given by the pH-meter 65-2 and judging therefrom that the pH value of the cleaning acid 63a is lower than a predetermined value (e.g., 7.0), the controller 67B recognizes that the performance of recovering amine from the $CO_2$-removed discharge gas 26b is maintained or not impaired and controls the flow passing through the control valve V12 so that the cleaning water 27c may be supplied to the circulation line L32. The cleaning water 27c is thus mixed with the cleaning water 27b and transferred to the acidic component-remover 13A.

On the other hand, when receiving the measured result given by the pH-meter 65-2 and judging therefrom that the pH value of the cleaning acid 63a is higher than a predetermined value (e.g., 7.0), the controller 67B recognizes that the performance of recovering amine from the $CO_2$-removed discharge gas 26b is impaired and controls the control valves V12 and V13 so that the cleaning water 27c may be supplied to the cleaning acid-circulation line L31. The cleaning water 27c is thus mixed with the cleaning acid 63a to lower the pH value of the cleaning acid 63b and thereby to recover the performance of recovering amine from the $CO_2$-removed discharge gas 26b.

In this way, according to the present embodiment, only at the time of need in accordance with the pH value of the cleaning acid 63a used in the acid-cleaner 62, the cleaning water 27c discharged from the acidic component-remover 13A is mixed with the cleaning acid 63a so as to lower the pH value of the cleaning acid 63b and thereby to recover the performance of recovering amine from the $CO_2$-removed discharge gas 26b. It can be therefore realized to stably keep or improve the performance of amine-recovering in the acid-cleaner 62.

Seventh Embodiment

The acidic gas recovery apparatus according to a seventh embodiment will be described with reference to the drawings. The same number or sign will be applied to a member having the same function as that in the embodiment described above, and the detailed description thereof will be omitted.

Figure 11:
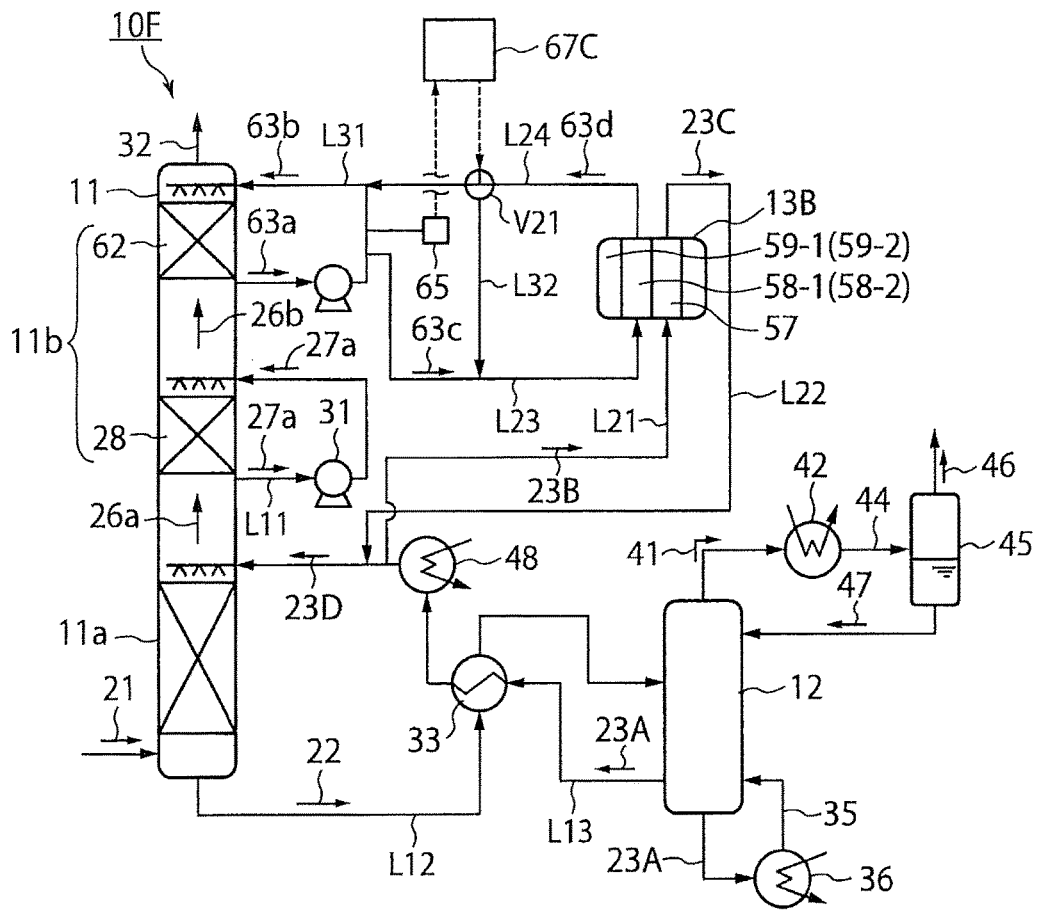
FIG. 11 schematically shows an example of another structure of the acidic gas recovery apparatus.

FIG. 11 schematically shows a structure of the acidic gas recovery apparatus according the seventh embodiment. As shown in FIG. 11, the acidic gas recovery apparatus 10F is the same as the acidic gas recovery apparatus 10C shown in FIG. 7 according the fourth embodiment except for additionally comprising a pH-meter 65 for measuring the pH value of the cleaning acid 63a used in the acid-cleaner 62, a controller 67C, a three-way valve V21, and a circulation line L32.

The controller 67C is connected to the pH-meter 65, the three-way valve V21 and other members constituting the $CO_2$-recovery apparatus 10, and has a function of controlling the flow passing through the three-way valve V21 in accordance with the measured result given by the pH-meter 65. Like the controller 67A, the controller 67C can comprise a memory bank, a calculating means and the like. In the controller 67C, the memory bank is beforehand stored with a map or the like of the relation between the pH value of the cleaning acid 63a and the efficiency of recovering amine from the $CO_2$-removed discharge gas 26b.

The three-way valve V21 is installed in the cleaning liquid-evacuation line L24 to control the path through which the cleaning water 27c discharged from the acidic component-remover 13A is supplied to the acid-cleaner 62 or to the acidic component-remover 13A.

When the measured result is sent from the pH-meter 65 to the controller 67C, the controller 67C controls the flow passing through the three-way valve V21 in accordance with the pH value of the cleaning acid 63a measured in the pH-meter 65 so that the cleaning water 27c in an adequate amount can flow into the acid-cleaner 62 or into the acidic component-remover 13A.

Specifically, in the present embodiment, when receiving the measured result given by the pH-meter 65 and judging therefrom that the pH value of the cleaning acid 63a is lower than a predetermined value (e.g., 7.0), the controller 67C recognizes that the performance of recovering amine from the $CO_2$-removed discharge gas 26b is maintained or not impaired and controls the flow passing through the three-way valve V21 so that the cleaning water 27c may be supplied to the circulation line L32. The cleaning acid 63d is thus mixed with the cleaning acid 63c and transferred to the acidic component-remover 13A. The cleaning acid 63d is circulated between the circulation line L32 and the acidic component-remover 13A, and thereby the pH value of the cleaning acid 63d can be lowered.

On the other hand, when receiving the measured result given by the pH-meter 65 and judging therefrom that the pH value of the cleaning acid 63a is higher than a predetermined value (e.g., 7.0), the controller 67C recognizes that the performance of recovering amine from the $CO_2$-removed discharge gas 26b is impaired and controls the flow passing through the three-way valve V21 so that the cleaning acid 63d may be supplied to the cleaning acid-circulation line L31. The cleaning acid 63d is thus mixed with the cleaning acid 63a to lower the pH value of the cleaning acid 63b and thereby to recover the performance of recovering amine from the $CO_2$-removed discharge gas 26b. The cleaning acid 63d is circulated between the acidic component-remover 13A and the circulation line L32 to further lower the pH value of the cleaning acid 63d. The cleaning acid 63d having a thus lowered pH value may be supplied to the acid-cleaner 62 so as to reduce the amount of chemicals added for the purpose of shifting the pH value of the cleaning acid 63a to the acidic side.

Thus, also in the present embodiment, only at the time of need in accordance with the pH value of the cleaning acid 63a used in the acid-cleaner 62, the cleaning acid 63d discharged from the acidic component-remover 13A is mixed with the cleaning acid 63a so as to lower the pH value of the cleaning acid 63b and thereby to recover the performance of recovering amine from the $CO_2$-removed discharge gas 26b. It can be therefore realized to stably keep or improve the performance of amine-recovering in the acid-cleaner 62.

In the present embodiment explained above, the supplying flow of the cleaning acid 63d discharged from the acidic component-remover 13A is controlled in accordance with the measured pH value of the cleaning acid 63a flowing through the cleaning acid-circulation line L31. However, the pH-meter 65 may be also installed in the cleaning water-circulation line L11 so that the supplying flow of the cleaning acid 63d discharged from the acidic component-remover 13A can be controlled also in consideration of the measured pH value of the cleaning water 27a flowing through the cleaning water-circulation line L11. Even if, for the purpose of lowering the pH value of the cleaning acid 63b, the cleaning acid 63d discharged from the acidic component-remover 13A is supplied to the cleaning acid 63a in accordance with not only the pH value of the cleaning acid 63a but also that of the cleaning water 27a used in the water-cleaner 28, it can be realized to stably keep or improve the performance of recovering amine from the $CO_2$-removed discharge gas 26b in the acid-cleaner 62.

The embodiments described above are explained provided that the discharge gas 21 contains $CO_2$ as the objective gas. However, the present embodiments can be also applied in the same manner even if the discharge gas 21 contains not only $CO_2$ but also other acidic gas components, such as, $SO_x$, $NO_x$, $H_2S$, COS, $CS_2$, $NH_3$ and HCN. Further, the present embodiments can be still also applied in the same manner even if the discharge gas 21 does not contain $CO_2$ but contains other acidic gas components.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fail within the scope and sprit of the invention.

The invention claimed is:

1. An acidic gas recovery apparatus comprising:
   an acidic gas-absorber configured to absorb at least a part of acidic gases contained in an objective gas into an absorbing liquid and to discharge said objective gas as an acid gas-removed gas,
   a regenerator configured to be provided with said absorbing liquid from said acidic gas-absorber and to release said acidic gases absorbed in said absorbing liquid;
   a gas-cleaner configured to clean said acid gas-removed gas discharged from said acidic gas-absorber with a cleaning liquid;
   a cleaning liquid drawing-out line configured to draw out said cleaning liquid;
   an absorbing liquid drawing-out line configured to draw a part of the absorbing liquid supplied to said acidic gas-absorber; and
   an acidic component-remover configure to be supplied with said cleaning liquid and said absorbing liquid via said cleaning liquid drawing-out line and said absorbing liquid drawing-out line, respectively; wherein
   said acidic component-remover comprises a cathode, an anode, an absorbing liquid-purification compartment configured to remove acidic components of said absorbing liquid, and a cleaning liquid compartment configured to be supplied with said cleaning liquid.

2. The acidic gas recovery apparatus according to claim 1, wherein
   said acidic component-remover further comprises a concentrate compartment configured to be supplied with a concentrate;
   said absorbing liquid-purification compartment, said cleaning liquid compartment and said concentrate compartment are separated with cation-exchange membranes or anion-exchange membranes;

said absorbing liquid-purification compartment is provided between on the anode side of said cleaning liquid compartment and on the cathode side of said concentrate compartment individually via said anion-exchange membranes; and said concentrate compartment is provided on the cathode side of said cleaning liquid compartment via said cation-exchange membrane.

3. The acidic gas recovery apparatus according to claim 1, wherein said absorbing liquid-purification compartment and said cleaning liquid compartment are separated with a bipolar membrane or an anion-exchange membrane;

said absorbing liquid-purification compartment is provided on the anode side of said cleaning liquid compartment via said bipolar membrane; and said anion-exchange membrane is provided on the anode side of said absorbing liquid-purification compartment provided that said absorbing liquid-purification compartment is positioned between a pair of said cleaning liquid compartments.

4. The acidic gas recovery apparatus according to claim 1, wherein the cleaning liquid discharged from said acidic component-remover is mixed with said cleaning liquid supplied to said acidic component-remover.

5. The acidic gas recovery apparatus according to claim 1, wherein said cleaning liquid comprises a cleaning water and a cleaning acid having a lower pH value than said cleaning water; and said gas-cleaner comprises a water-cleaner configured to clean said acid gas-removed gas with said cleaning water, and an acid-cleaner configured to clean said acid gas-removed gas with said cleaning acid.

6. The acidic gas recovery apparatus according to claim 5, wherein said cleaning liquid drawing-out line is configured to supply a part of said cleaning water or said cleaning acid to said acidic component-remover, and said cleaning water or said cleaning acid discharged from said acidic component-remover is configured to be mixed with said cleaning acid supplied to said acid-cleaner.

7. The acidic gas recovery apparatus according to claim 5, further comprising:

a pH-meter configured to measure the pH value of said cleaning liquid which is at least one of said cleaning water used in said water-cleaner and said cleaning acid used in said acid-cleaner;

a cleaning acid supply configured to supply a fresh cleaning acid into a cleaning acid-circulation line, the cleaning acid-circulation line being configured to supply said fresh cleaning acid to said acid-cleaner; and a controller configured to control an amount of said fresh cleaning acid supplied into said cleaning acid-circulation line in accordance with the pH value of said cleaning liquid.

8. The acidic gas recovery apparatus according to claim 5, wherein said gas-cleaner comprises said water-cleaner and said acid-cleaner, and further comprises a pH-meter configured to measure the pH value of said cleaning liquid discharged from said acidic component-remover and that of said cleaning acid used in said acid-cleaner;

a control valve configured to adjust an amount of said cleaning liquid discharged from said acidic component-remover to be supplied to said acid-cleaner or said acidic component-remover; and a controller configured to control said control valve in accordance with the pH values of said cleaning liquid and said cleaning acid measured in said pH-meter.

9. The acidic gas recovery apparatus according to claim 5, further comprising a pH-meter configured to measure the pH value of said cleaning liquid which is said cleaning water used in said water-cleaner or said cleaning acid used in said acid-cleaner;

a three-way valve configured to supply said cleaning liquid discharged from said acidic component-remover to said water-cleaner, to said acid-cleaner or to said acidic component-remover; and a controller configured to control said three-way valve in accordance with the pH value of said cleaning liquid measured in said pH-meter.

10. An acidic gas recovery method comprising:

an absorption step absorbing at least a part of acidic gases contained in an objective gas into an absorbing liquid and discharging said objective gas as an acid gas-removed gas;

a gas-cleaning step cleaning said acid gas-removed gas with a cleaning liquid; and an acidic component-removal step removing acidic components from said absorbing liquid in an acidic component-remover, the acidic component-remover comprising an anode, a cathode, an absorbing liquid-purification compartment provided between said anode and said cathode, and a cleaning liquid compartment provided between said anode and said cathode, wherein said absorbing liquid-purification compartment and said cleaning liquid compartment are separated with at least one membrane, wherein the acidic component-removal step comprises:

supplying at least a part of said absorbing liquid to be used in said absorption step to said absorbing liquid-purification compartment in said acidic component-remover;

supplying at least a part of said cleaning liquid to said cleaning liquid compartment in said acidic component-remover; and applying voltage between said anode and said cathode.

* * * * *